United States Patent
Rodrigue

(10) Patent No.: US 7,644,906 B2
(45) Date of Patent: Jan. 12, 2010

(54) APPARATUS FOR WINDING AN ELONGATE STRAP ONTO A WINCH

(75) Inventor: Marquis Rodrigue, St-Victor (CA)

(73) Assignee: 9182-9622 Quebec Inc., Sainte-Clotilde-de-Beauce, Quebec ( * ) Notice: Subject to any disclaimer, the term of this patent is extended or adjusted under 35 U.S.C. 154(b) by 99 days.

(21) Appl. No.: 12/076,515

(22) Filed: Mar. 19, 2008

(65) Prior Publication Data

US 2009/0236458 A1 Sep. 24, 2009

(51) Int. Cl.
*B21F 9/00* (2006.01)
(52) U.S. Cl. .................................. 254/242; 123/185.3
(58) Field of Classification Search ................ 254/242, 254/243; 123/185.1, 185.2, 185.3, 185.4, 123/185.14, 185.15
See application file for complete search history.

(56) References Cited

U.S. PATENT DOCUMENTS

| | | | |
|---|---|---|---|
| 2,848,987 A * | 8/1958 | Morden | 123/185.4 |
| 2,868,186 A | 1/1959 | Schnacke | |
| 3,782,355 A | 1/1974 | Hammen | |
| 4,036,476 A | 7/1977 | Douce et al. | |
| 4,426,961 A * | 1/1984 | Grinde | 123/179.26 |
| 5,287,832 A | 2/1994 | Uhl | |
| 5,607,143 A | 3/1997 | Regal | |
| 5,791,844 A | 8/1998 | Anderson | |
| 6,019,551 A | 2/2000 | Stephenson | |
| 6,102,637 A | 8/2000 | Mocci | |
| 6,363,901 B1 | 4/2002 | Watanabe et al. | |
| 6,398,470 B1 | 6/2002 | Mosley | |
| 6,467,755 B2 | 10/2002 | Reilly et al. | |
| 6,626,621 B1 | 9/2003 | Hugg | |
| 6,631,866 B1 | 10/2003 | Obrink et al. | |

(Continued)

*Primary Examiner*—Emmanuel M Marcelo
(74) *Attorney, Agent, or Firm*—Fasken Martineau DuMoulin LLP

(57) ABSTRACT

The present invention relates to an apparatus for winding an elongate strap onto a winch. The winch has a hub member to which may be coupled the strap winding apparatus and a reel element fixed to the hub member about which may be wound the elongate strap. The strap winding apparatus has a protective housing and a winding assembly at least partially retained within the housing. The winding assembly includes a coupling ring sized to fit over the hub member for selective mating therewith and a spool assembly. The spool assembly has a spool member mounted in surrounding relation with the coupling ring, a cord which may be wound about the spool member and which may be pulled to urge rotation of the spool member in a first direction, and a torsion spring member connected to both the housing and the spool member. The spring member is configured to store spring energy when the cord is pulled and the spool member rotates in the first direction, and to release spring energy to the spool member when the cord is released thereby urging the spool member to rotate in a second direction opposite to the first direction and causing the cord to be wound about the spool member. The coupling ring has an engagement member pivotally mounted thereto. The engagement member is engageable with both the hub member and the spool member so as to allow torque from the spool member to be transmitted to the hub member via the coupling ring such that when the cord is pulled and the spool member rotates in the first direction the hub member will also rotate thereby causing the elongate strap to be wound about the reel member. The apparatus may be also be used to wind other elongate flexible elements such as webbing, a rope, a cable or a cord.

24 Claims, 27 Drawing Sheets

U.S. PATENT DOCUMENTS

| | | |
|---|---|---|
| 6,659,697 B1 | 12/2003 | Guenther |
| 6,705,597 B1 | 3/2004 | Reilly et al. |
| 6,718,931 B2 * | 4/2004 | Morishige et al. ........ 123/185.3 |
| 6,824,339 B1 | 11/2004 | Childers |
| 6,848,872 B2 | 2/2005 | Perkins, Jr. |
| 6,854,939 B2 | 2/2005 | Im |
| 6,916,143 B2 | 7/2005 | Guenther |
| D526,173 S | 8/2006 | Hudson |
| 7,096,842 B2 | 8/2006 | Lin et al. |
| 7,108,246 B2 * | 9/2006 | Fortin .......................... 254/222 |
| 7,128,307 B2 * | 10/2006 | Dow ........................... 254/342 |
| 7,216,849 B2 | 5/2007 | Tremblay |
| 2006/0035770 A1 | 2/2006 | Crowson et al. |

* cited by examiner

APPARATUS FOR WINDING AN ELONGATE STRAP ONTO A WINCH

FIELD OF THE INVENTION

The present invention relates to an apparatus for winding an elongate strap or other flexible element onto a winch.

BACKGROUND OF THE INVENTION

Flat bed trailers have been used increasingly to transport timber, lumber, metal stock, machinery and other cargo. The cargo is usually secured to the flat bed using long flexible straps carried on winches mounted to the underside of the flat bed. In a typical cargo securing operation, a suitable length of strap is drawn from the winch, placed across the top of the cargo and attached to both sides of the flat bed.

Once the cargo is removed from the flat bed, it becomes necessary to rewind the length of strap onto the winch for safe storage. This task is often performed by manually rotating the hub member which projects from the side of the winch bracket. More specifically, the operator or user grasps the hub member and turns the hub member manually in angular increments in the winch take-up direction to effect winding of the strap onto the winch. When performed in this manner, the winding tends to be carried out in an discontinuous or interrupted fashion because the user is required to constantly readjust his grip on the hub member. The user's efforts may be further hampered by the little clearance which may exist between the hub member and the flat bed. As a result, manual winding tends to be a highly inefficient, tedious, time-consuming and labour-intensive procedure. Furthermore, because of the repetitive nature of the movement, the user may be at risk of developing repetitive strain disorder or other such condition. These problems are further compounded or exacerbated in the case where this procedure needs to be repeated to effect strap winding on multiple winches.

Several attempts have been made to facilitate the winding of a strap onto a winch. One such example is described in U.S. Pat. No. 5,791,844 issued to Anderson. This patent relates to a portable crank assembly provided with a handle, an expandable compression member adapted for insertion into the hollow core of the hub member and a bar connecting the handle to the compression member. The compression member is attached to the bar with a bolt and wing nut. The bolt extends through the compression member and carries thereon a backup washer which bears against the compression member. By tightening the wing nut on the bolt, the backup washer can be drawn against the compression member to thereby apply a compressive force on the compression member. The application of this force causes the compression member to expand outwardly for frictional engagement with the inner wall of the winch hub member. Thus arranged, the crank assembly and hub member can be locked together for rotation. To wind the strap onto the winch, the user grasps the grip element of the handle and manually operates the crank assembly. The crank assembly can be decoupled from the hub member by loosening the wing nut to allow the compression member to return to its original shape and size and be disengaged from the hub member.

While this crank assembly tends to constitute an improvement over manual winding of the strap onto the winch, there are concerns that the device is not sufficiently robust to resist wear arising from repeated use. In particular, the compression member of the crank assembly may be prone to excessive wear and accordingly, may require frequent replacement. In addition, because of its configuration, the repeated use of this device may still present some risk of injury to the user by placing undue strain on the wrist of the user.

Another approach to winding a strap onto a winch was taken in U.S. Pat. No. 6,102,637 issued to Mocci. This patent describes a winch winding bar in the nature of a steel rod in which several bends have been formed therein to define two rod portions which are axially offset from each other. Sleeves are fitted over these rod portions and provide a surface which may be gripped by the user when using the winch winding bar. A hook is formed at one end of the steel rod for receipt within the apertures defined in the annular wall of the hub member. The hook provides an interface to the winch and serves to transfer the rotary motion from the winding bar to the winch. To wind the strap about the winch, the user inserts the hook into the apertures of the hub member, places his/her hands on the sleeves and then applies a rotary force on the winch winding bar. As the winding bar rotates, the strap becomes wound onto the winch. While this device obviates the drawbacks associated with the portable crank assembly described above, its operation requires the use of two hands which may not be desirable in certain field applications.

In light of the foregoing, it would be advantageous to have a portable apparatus for mechanically winding a strap onto the winch that is of robust construction, is safe, simple and quick to use and does not require two hands during operation.

SUMMARY OF THE INVENTION

In accordance with one embodiment of the present invention, there is provided an apparatus for winding an elongate strap onto a winch. The winch has a hub member to which may be coupled the strap winding apparatus and a reel element fixed to the hub member about which may be wound the elongate strap. The strap winding apparatus has a protective housing and a winding assembly at least partially retained within the housing. The winding assembly includes a coupling ring sized to fit over the hub member for selective mating therewith and a spool assembly. The spool assembly has a spool member mounted in surrounding relation with the coupling ring, a cord which may be wound about the spool member and which may be pulled to urge rotation of the spool member in a first direction, and a torsion spring member connected to the housing and the spool member. The spring member is configured to store spring energy when the cord is pulled and the spool member rotates in the first direction, and to release spring energy to the spool member when the cord is released thereby urging the spool member to rotate in a second direction opposite to the first direction and causing the cord to be wound about the spool member. The coupling ring has an engagement-member pivotally mounted thereto. The engagement member is engageable with both the hub member and the spool member so as to allow torque from the spool member to be transmitted to the hub member via the coupling ring such that when the cord is pulled and the spool member rotates in the first direction the hub member will also rotate thereby causing the elongate strap to be wound about the reel member.

In another feature, the coupling ring has a central aperture extending therethrough and includes an outer surface, an inner surface and a plurality of projections extending radially inward from the inner surface into the central aperture. The plurality of projections is configured for abutment with a portion of the hub member. Additionally, the hub member has an annular wall. Each projection of the plurality has a generally arcuate surface configured to correspond substantially with the curvature of the annular wall. In a further feature, the plurality of projections includes four projections equally spaced from each other.

In an alternative feature, the coupling ring has a central aperture extending therethrough. The central aperture has a generally circular shape.

In still another feature, the coupling ring has a central aperture extending therethrough and includes an outer radial surface, an inner radial surface and a cutout defined in the coupling ring extending between the outer radial surface and the inner radial surface thereof. The cutout provides access to the central aperture. The engagement member is disposed at least partially within the cutout.

In an additional feature, the engagement member is pivotable between an engaged position and a disengaged position and includes a first end and a second end. When in the engaged position, the first end of the engagement member extends outwardly of the cutout to engage the spool member and the second end of the engagement member projects into the central aperture of the coupling ring or engagement with the hub member. When in the disengaged position, the first end of the engagement member is at least substantially contained within the cutout.

In a further feature, the coupling ring includes means for biasing the engagement member in the engaged position. The biasing means includes a compression coil spring having a first end supported by an interior surface of the coupling ring and a second end abutting the first end of the engagement member.

In yet another feature, the engagement member is pivotable between an engaged position and a disengaged position. When the engagement member is in the disengaged position, the spool member is free to rotate relative to the coupling ring. Optionally, the coupling ring may be free to rotate relative to the hub member. The engagement member has a first end engageable with the spool member and an opposed second end engageable with the hub member. The hub member includes an annular wall having an outer surface. When the engagement member is in the disengaged position, the second end of the engagement member bears against the outer surface of the annular wall.

In an alternative feature, the engagement member has a first end engageable with the spool member and an opposed second end engageable with the hub member. The hub member has an annular wall with a plurality of openings defined therein. When the engagement member is in the disengaged position, the second end of the engagement member is received within one of the plurality of openings in the annular wall.

In still another feature, the hub member has an annular wall with a plurality of openings defined therein. The spool member has a generally annular body defined by an inner radial surface and an outer radial surface. The inner radial surface has defined therein a plurality of grooves. The engagement member has a first end engageable with the any one of the plurality of grooves defined in the inner radial surface of the spool member and an opposed second end engageable with any one of the plurality of openings defined in the annular wall of the hub member. In one feature, the plurality of grooves includes eight grooves evenly spaced from each other. In another feature, the plurality of grooves have a shape selected from the group consisting of: (a) a V-shape; and (b) a semi-circle.

In a further feature, the strap winding apparatus included indexed mating means operable to fix the coupling ring for rotation with the spool member at a predetermined angular position selected from a set of discrete angular positions relative to the spool member. The indexed mating means includes a plurality of indexing notches and an indexing pin engageable with the any one of the plurality of the indexing notches. The spool member has a generally annular body defined by an inner radial surface and an outer radial surface, the inner radial surface having defined therein a plurality of grooves. The plurality of grooves defining the plurality the indexing notches of the indexed mating means. The engagement member has a first end engageable with the one of the plurality of grooves defined in the inner radial surface of the spool member and an opposed second end engageable with the hub member. The first end of the engagement member defines the indexing pin of the indexed mating means.

In another feature, the spool member has a generally annular body defined by an inner radial surface and an outer radial surface. The annular body has a groove formed therein running circumferentially about the radial outer surface. The groove is configured to accommodate the cord when it is wound about the spool member.

In additional feature, the cord has an inner end attached to the spool member and an outer end. The spool assembly further includes a handle fastened to the outer end of the cord for actuating the winding assembly.

In accordance with another embodiment of the present invention, there is provided an apparatus for winding an elongate strap onto a winch. The winch has a hub member to which may be coupled the strap winding apparatus and a reel element fixed to the hub member about which may be wound the elongate strap. The strap winding apparatus has a protective housing and a winding assembly at least partially retained within the housing. The winding assembly includes a coupling ring sized to fit over the hub member for selective mating therewith and a spool assembly. The spool assembly has a spool member mounted in surrounding relation with the coupling ring, a cord which may be wound about the spool member and which may be pulled to urge rotation of the spool member in a first direction, and means for urging automatic rewinding of the cord onto the spool member when the cord is released. The coupling ring has an engagement member pivotally mounted thereto. The engagement member is engageable with both the hub member and the spool member in a torque transmitting relationship therewith such that when the cord is pulled and the spool member rotates in the first direction the hub member will also rotate thereby causing the elongate strap to be wound about the reel member.

In a further feature, the automatic rewinding means includes a torsion spring member connected to both the housing and the spool member. The torsion spring member is configured to store spring energy when the cord is pulled and the spool member rotates in the first direction, and to release spring energy to the spool member when the cord is released thereby urging the spool member to rotate in a second direction opposite to the first direction and causing the cord to be wound about the spool member. In another feature, the torsion spring member has an inner end fixed to the housing and an outer end secured to the spool member for rotation therewith.

BRIEF DESCRIPTION OF THE DRAWINGS

The embodiments of the present invention shall be more clearly understood with reference to the following detailed description of the embodiments of the invention taken in conjunction with the accompanying drawings, in which:

FIG. 4a is an end elevation view of the strap winding apparatus shown in FIG. 3a;

FIG. 7 is an exploded, perspective view of the strap winding apparatus shown in FIG. 3a;

FIG. 8b is an elevation view of the coupling member illustrated in FIG. 8a;

FIG. 9c is another elevation view of the spool member shown in FIG. 9a;

FIG. 17b is an elevation view of the coupling member illustrated in FIG. 17a;

FIG. 18a is a perspective view showing in isolation the spool member of the winding assembly illustrated in FIG. 16, with the handle and cord thereof omitted for clarity;

FIG. 18b is an end elevation view of the spool member shown in FIG. 18a;

FIG. 18c is another elevation view of the spool member shown in FIG. 18a;

DETAILED DESCRIPTION OF THE EMBODIMENTS OF THE INVENTION

Figure 1:
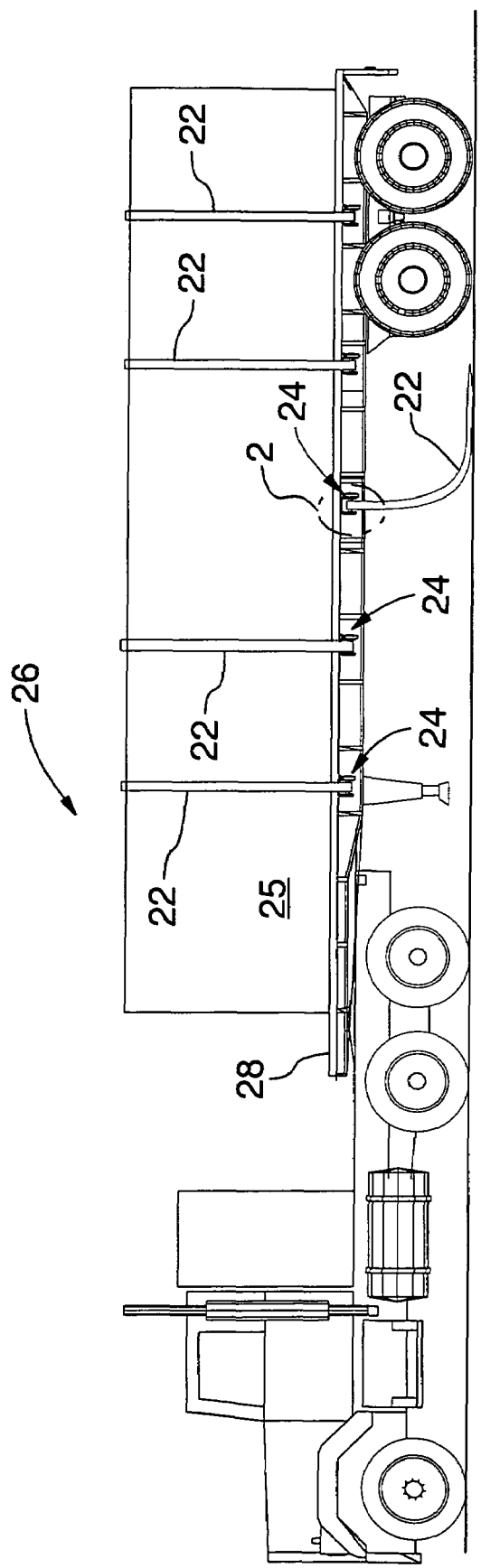
FIG. 1 is a side elevation view of a flat bed transport vehicle having multiple winches upon which lading straps may be wound, carried on the underside of the vehicle's flat bed.

The description which follows, and the embodiments described therein are provided by way of illustration of an example, or examples of particular embodiments of principles and aspects of the present invention. These examples are provided for the purposes of explanation and not of limitation, of those principles of the invention. In the description that follows, like parts are marked throughout the specification and the drawings with the same respective reference numerals.

Referring to FIGS. 1, 2, 3a, 3b and 10, there is shown a strap winding apparatus designated generally with reference numeral 20. The strap winding apparatus 20 is designed to wind an elongate strap 22 onto a winch 24 when the strap 22 is not in use and needs to be safely stored. In this embodiment, the elongate strap 22 is a lading strap of the type used to restrain and/or secure cargo 25 onto a support surface. However, it will be appreciated that the strap winding apparatus 20 is not limited to applications and/or uses involving lading straps, but rather it may be used to similar advantage for winding other elongate flexible elements, such as webbings, ropes, cable, cords or the like.

In the preferred embodiment, the winch 24 is a winch of the type carried on the underside of a vehicle, such as a flat bed transport vehicle 26. As shown in FIG. 1, the vehicle 26 has a plurality of winches 24 disposed at spaced apart locations on one side of the flat bed 28 of the vehicle 26. Each winch 26 is operable to dispense its own length of strap 22 to engage a load carried by the vehicle 26.

Each winch 24 includes a generally inverted U-shaped bracket member 30 having a pair of spaced apart, first and second bracket arms 32 and 34 and a back plate 36 mounted to extend between, and join, the first arm 32 to the second arm 34. The back 36 is fixedly secured to the flat bed 28 of the vehicle 26 by welding, bolting or the like. The first and second bracket arms 32 and 34 extend downwardly from the back plate 36 and retain between them a reel member or winch drum 40 that is mounted for rotation about a generally horizontal axis H-H.

Figure 11:
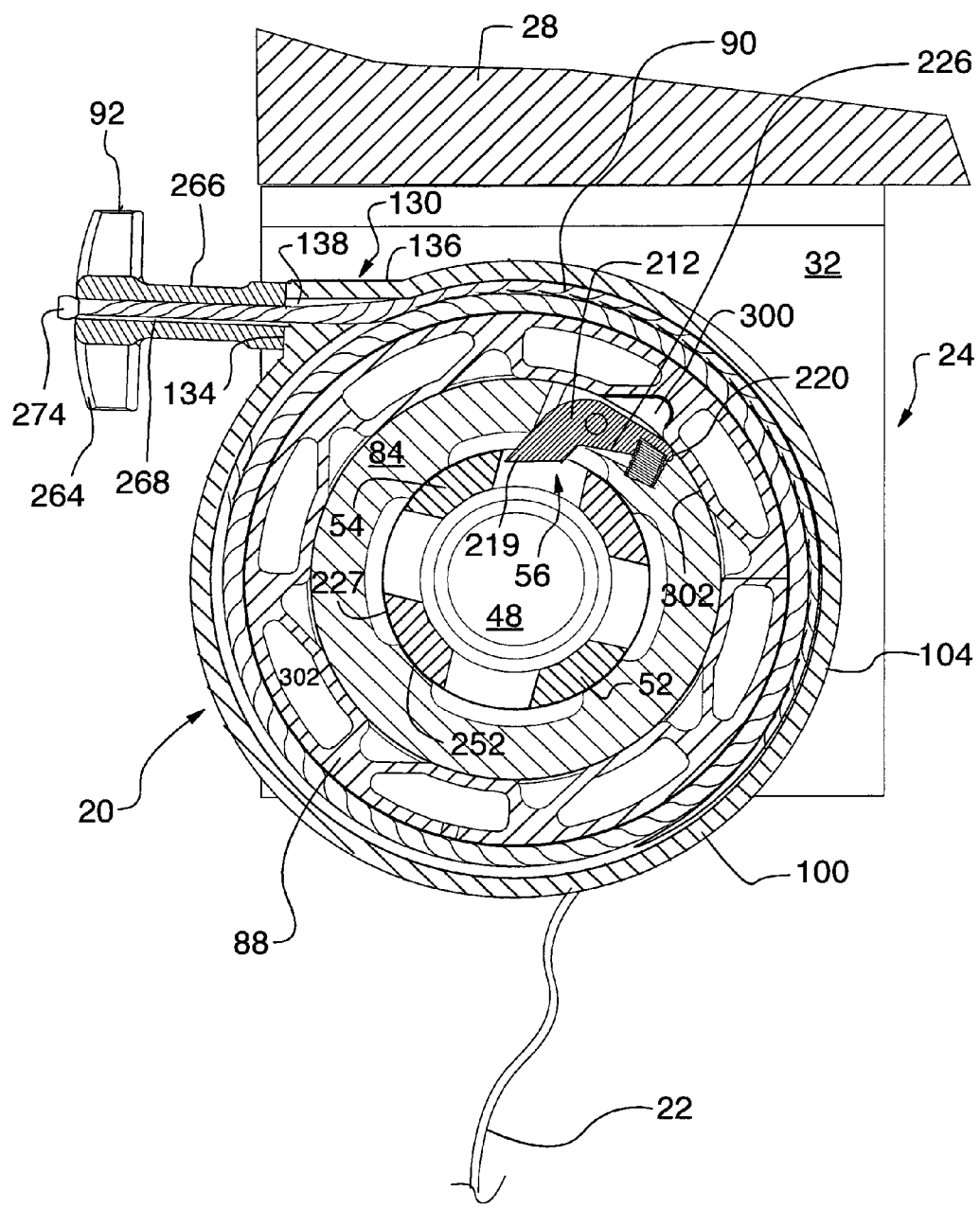
FIG. 11 is a cross-sectional view of the strap winding apparatus illustrated in FIG. 2 taken along the line '11-11', showing the spring-loaded engagement member of the coupling member in a disengaged position.

In this embodiment, the reel member 40 takes the form of a generally cylindrical shaft 42 having a first end 44 adjacent first bracket arm 32, a second end 46 adjacent the second bracket arm 34, and a central opening 48 formed in the shaft 42 (as best shown in FIG. 11) and extending between the first and second ends 44 and 46 thereof. A pair of diametrically opposed and aligned longitudinal slots 50 defined in the shaft 42 provide access to the central opening 48. The aligned slots 50 and the central opening 48 are configured to receive an end of the elongate strap 22. More specifically, when attaching the elongate strap 22 to-the winch 24, an end of the strap 22 is extended through the aligned slots 50 and the strap is wound continuously about the shaft 42. The end of the strap 22 is secured to the reel member 40 by the winds of the strap itself (i.e. the outer layers of the strap).

Projecting from the first end 44 of the shaft 42 and extending outwardly from the first bracket arm 32, is an exposed hub member 52 that is fixed for rotation with the shaft 42. The hub member 52 has a generally tubular configuration defined by an annular wall 54. A plurality of apertures 56 are defined in the annular wall 54 at circumferentially spaced locations. These apertures 56 are configured to receive a bar or rod to turn the hub member 52 to thereby allow an operator or user to tighten or cinch the strap 22 as required to secure the cargo 25 or load onto the flat bed 28.

The winch 24 is also provided with a ratchet mechanism 60 disposed on the outer face 62 of the second bracket arm 34. The ratchet mechanism 60 includes a ratchet wheel 64 fixed to the second end 46 of the shaft 42 for rotation therewith and a pawl 66. The pawl has at its distal of free end 68 a pair of tines 70 and 72 which are engageable with circumferentially spaced teeth 74 of the ratchet wheel 64. The pawl 66 is carried above the ratchet wheel 64 with its proximal end 76 pivotally mounted to the outer face 62 of the second bracket arm 34 by a pivot pin 78. During operation, the free end 68 of the pawl 66 may be biased toward the ratchet wheel 64 such that its tines 70 and 72 are urged into engagement with the teeth 74 thereby blocking counterclockwise rotation of the ratchet wheel 64 and preventing the strap 22 from further unwinding.

Figure 2:
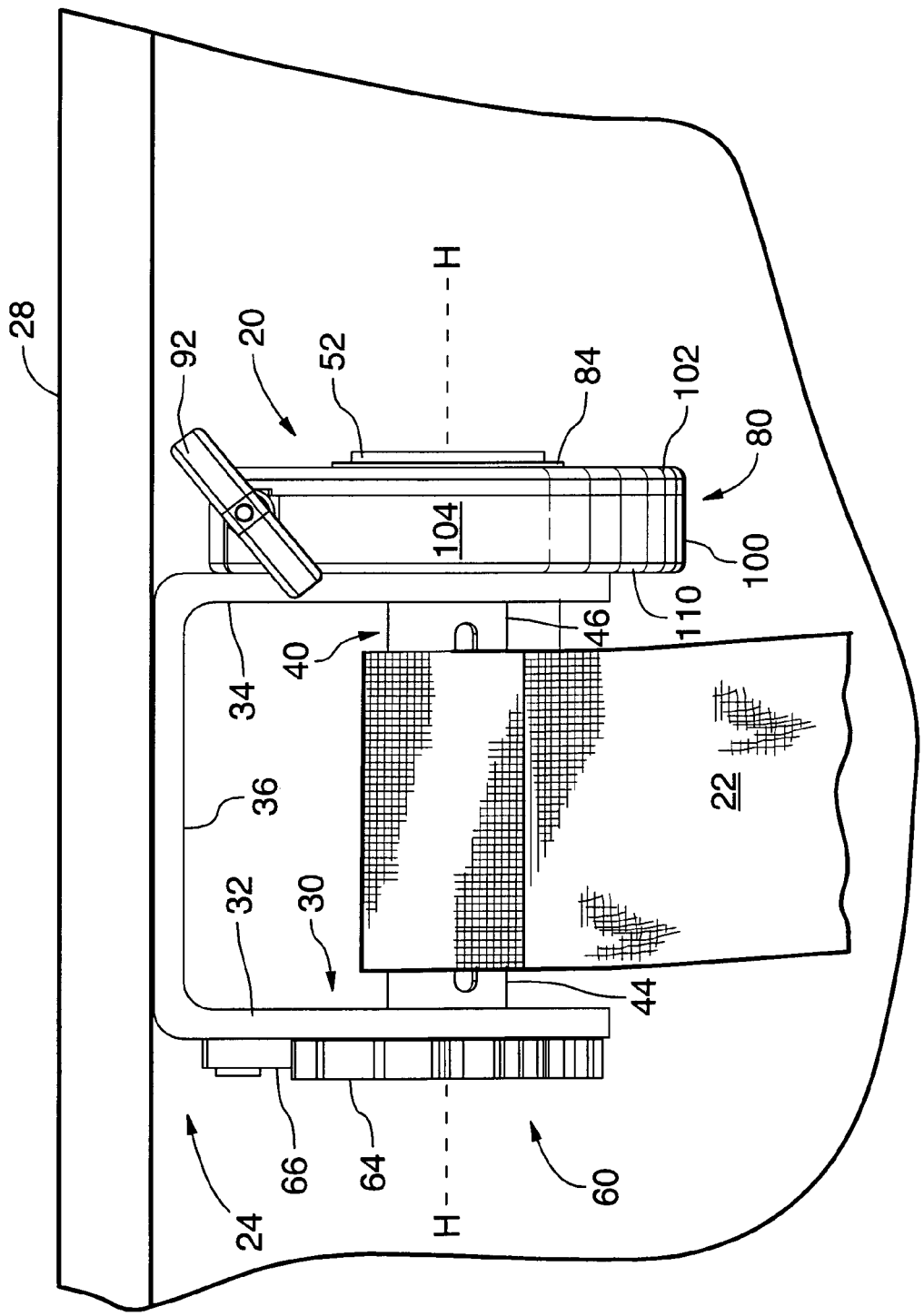
FIG. 2 is a magnified, elevation view of an apparatus for winding a strap onto a winch in accordance with an embodiment of the invention, the strap winding apparatus shown coupled to winch of the flat bed transport vehicle illustrated in the encircled portion "2" in FIG. 1, the reel member of the winch carrying a portion of an elongate strap.
Figure 3A:
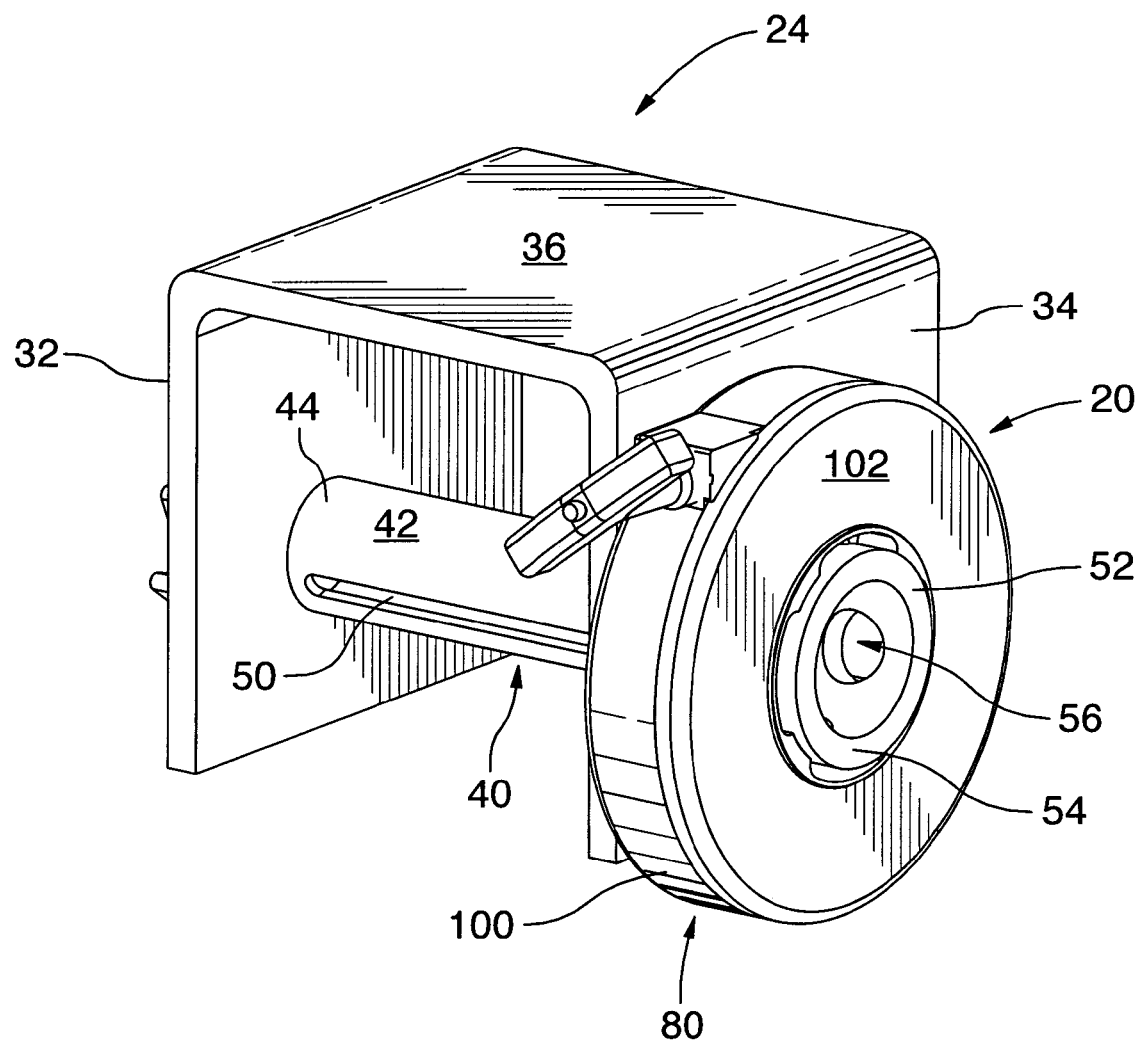
FIG. 3a is a front left perspective view showing in isolation the winch and the strap winding apparatus illustrated in FIG. 2, with the strap removed for clarity.
Figure 3B:
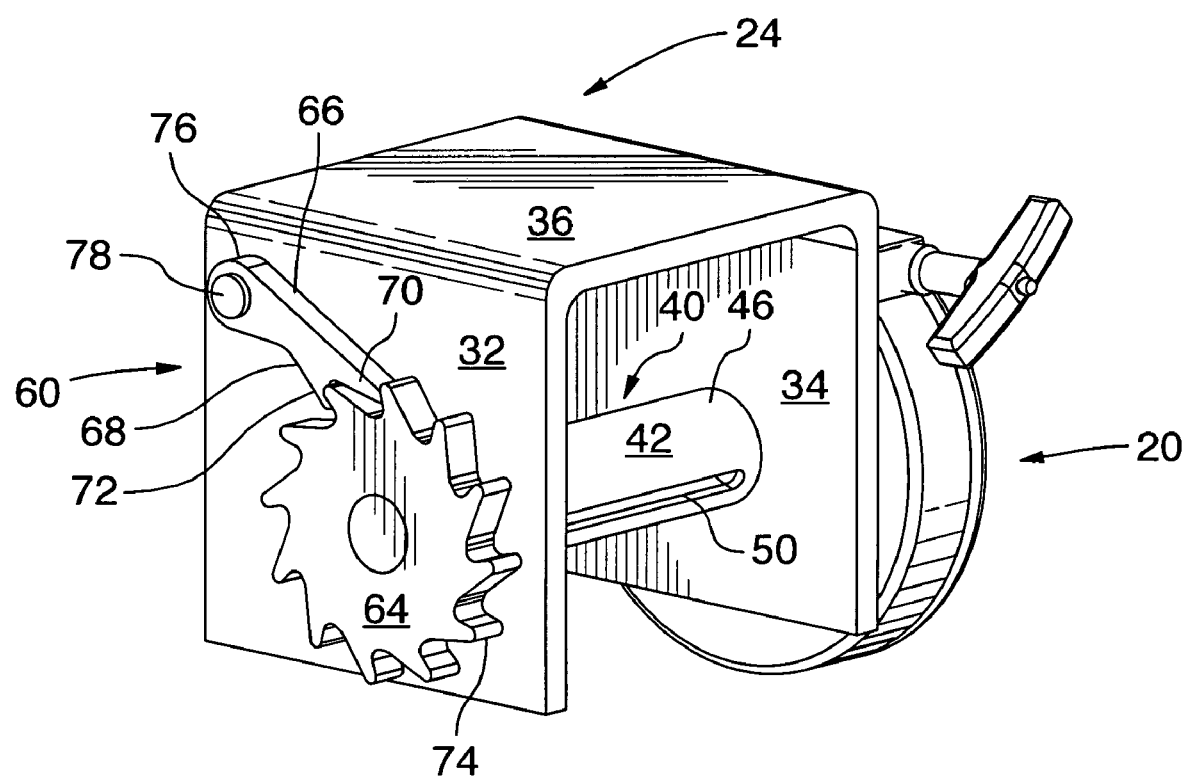
FIG. 3b is a front right perspective view showing in isolation the winch and the strap winding apparatus illustrated in FIG. 2, with the strap removed for clarity.
Figure 7:
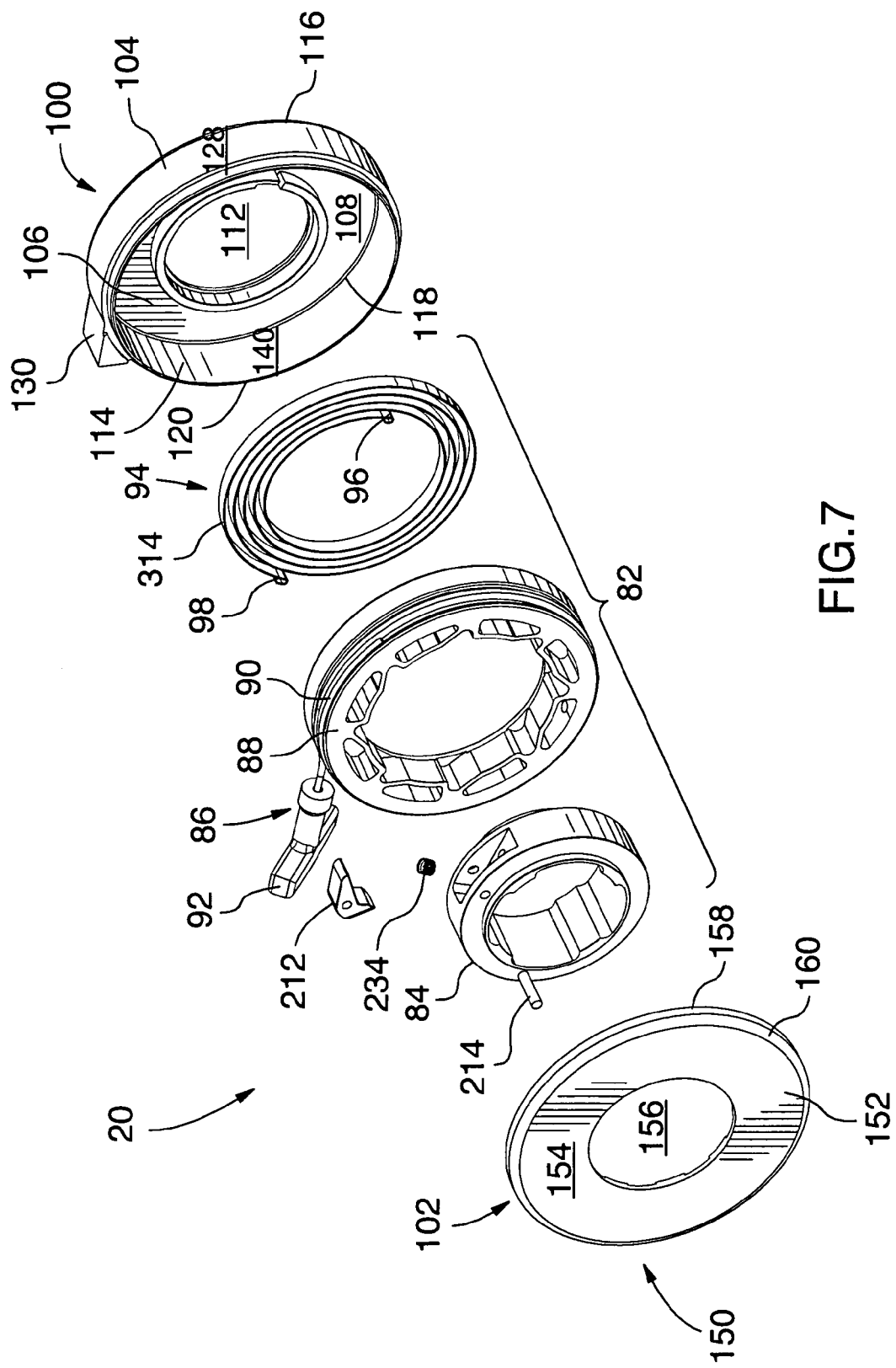

Referring now to FIGS. 2, 3a and 7, the strap winding apparatus 20 includes a generally annular, protective housing 80 and a winding assembly 82 retained at least partially within the housing 80. As will be explained in greater detail below, the winding assembly 82 includes a coupling ring 84 sized to fit over the hub member 52 for selective mating therewith; a spool assembly 86 having a spool member 88 mounted in surrounding relation with the coupling ring 84 and fixable for rotation therewith, a pull cord 90 which may be wound about the spool member 88 and which may be pulled to urge rotation of the spool member 88, and a handle 92 secured to one end of the pull cord 90 for actuating the winding assembly 82; and a spiral torsion spring (also known as a power or clock spring) 94 provided with a first inner end 96 fixed to a portion of the housing 80 and a second outer end 98 fixed to the spool member 88 and operable to automatically rewind the cord 90 onto the spool member 88.

The housing 80 is sized such that it can be accommodated in the clearance between the hub member 52 and the flat bed 28, when the strap winding apparatus 20 is coupled to the winch 24. The housing 80 is defined by a first cover member 100 and a second cover member 102 engageable with the first cover member 100. The first cover member 100 has a flanged, generally annular body 104 that is defined at least partially by an end wall 106 having an inner face 108, an outer face 110 and a central aperture 112 formed therethrough, and a sidewall 114 projecting outwardly from the inner face 108 and extending circumferentially about the outermost radial edge 116 of the end wall 106. The central aperture 112 is sized larger than the diameter of the hub member 52.

The sidewall 114 has a proximal edge 118 that is joined to outermost radial edge 116 of the end wall 106, and a distal edge 120. At a location intermediate the proximal edge 118 and distal edge 120 but closer to the distal edge 120, the thickness of the sidewall 114 is decreased so as to define a narrow shoulder portion 124 and a circumferential lip 126 projecting from the shoulder portion 124. As will be explained in greater detail below, when the first cover member 100 is fitted for engagement with the second cover member 102, a portion of the second cover member 102 will surround the circumferential lip 126 for snug engagement therewith and abut the shoulder portion 124.

Figure 5:
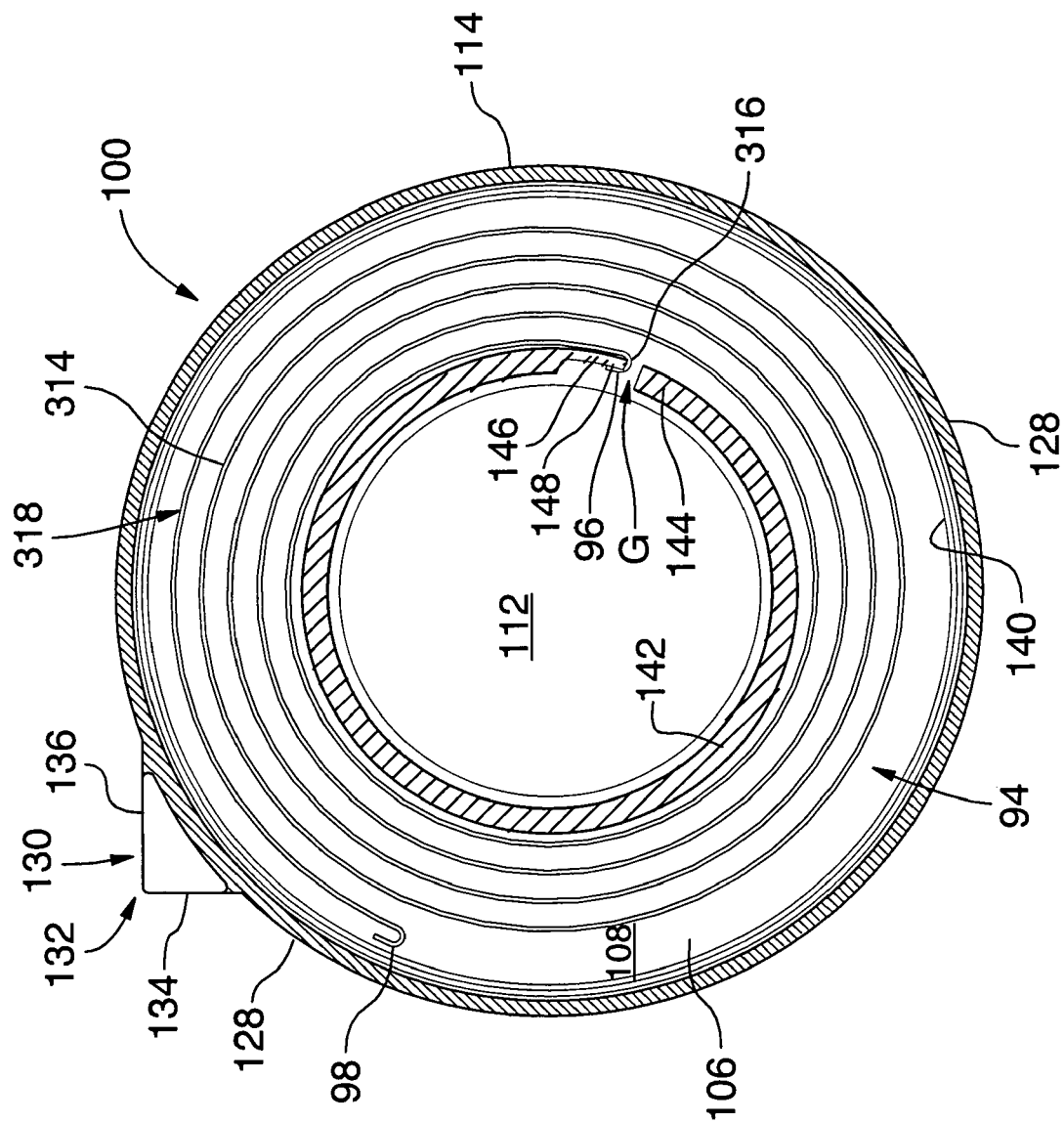
FIG. 5 is an end elevation view of the strap winding apparatus similar to that illustrated in FIG. 4 showing a first cover member of the apparatus housing with a torsion spiral spring mounted therein, a second cover member and remaining portions of the internally housed winding assembly being omitted for clarity.

Jutting radially outward from the outer face 128 of the sidewall 114, is a reinforced sidewall portion 130. As best shown in FIGS. 5 and 11, the reinforced sidewall portion 130 has a generally triangular profile whose apex 132 is defined by first and second sides 134 and 136. A bore or passage 138 sized to accommodate therethrough the pull cord 90, extends into the first side 134 and opens onto the inner face 140 of the sidewall 114. The first side 134 presents a stop or abutting surface against which a portion of the handle 92 may be urged to bear. While in the preferred embodiment, the reinforced sidewall portion 130 is integrally formed with the sidewall 114, in other embodiments the reinforced portion and the sidewall could be formed as two distinct components which could be fabricated from the same or different materials.

The first cover member 100 is further provided with a flange member 142 that projects outwardly from the inner face 108 of the end wall 106 and at least partially radially bounds the central aperture 112. The flange member 142 has a generally penannular structure provided with a first end 144, an opposed second end 146 and a gap G extending between the first and second ends 144 and 146. The wall thickness of the flange member 142 is decreased at the second end 146 to define a finger-like catch 148 upon which may be retained the first inner end 96 of the spiral torsion spring 94.

Figure 4A:
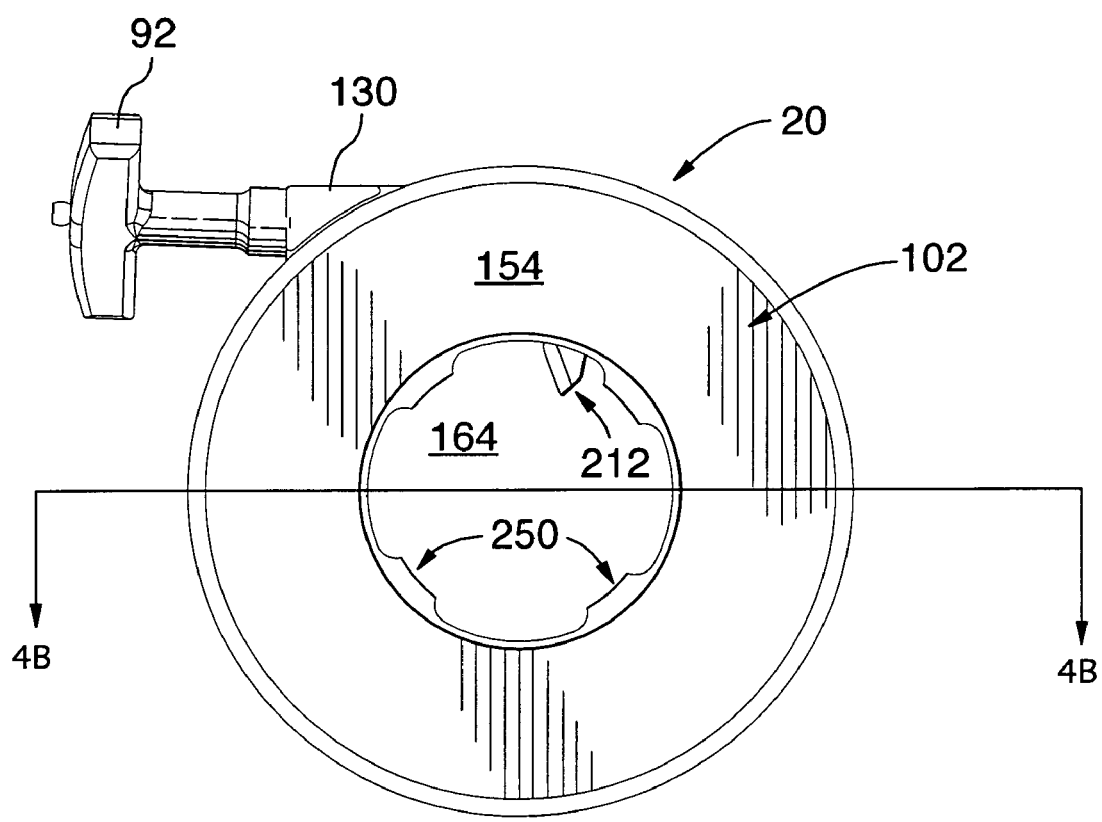
Figure 4B:
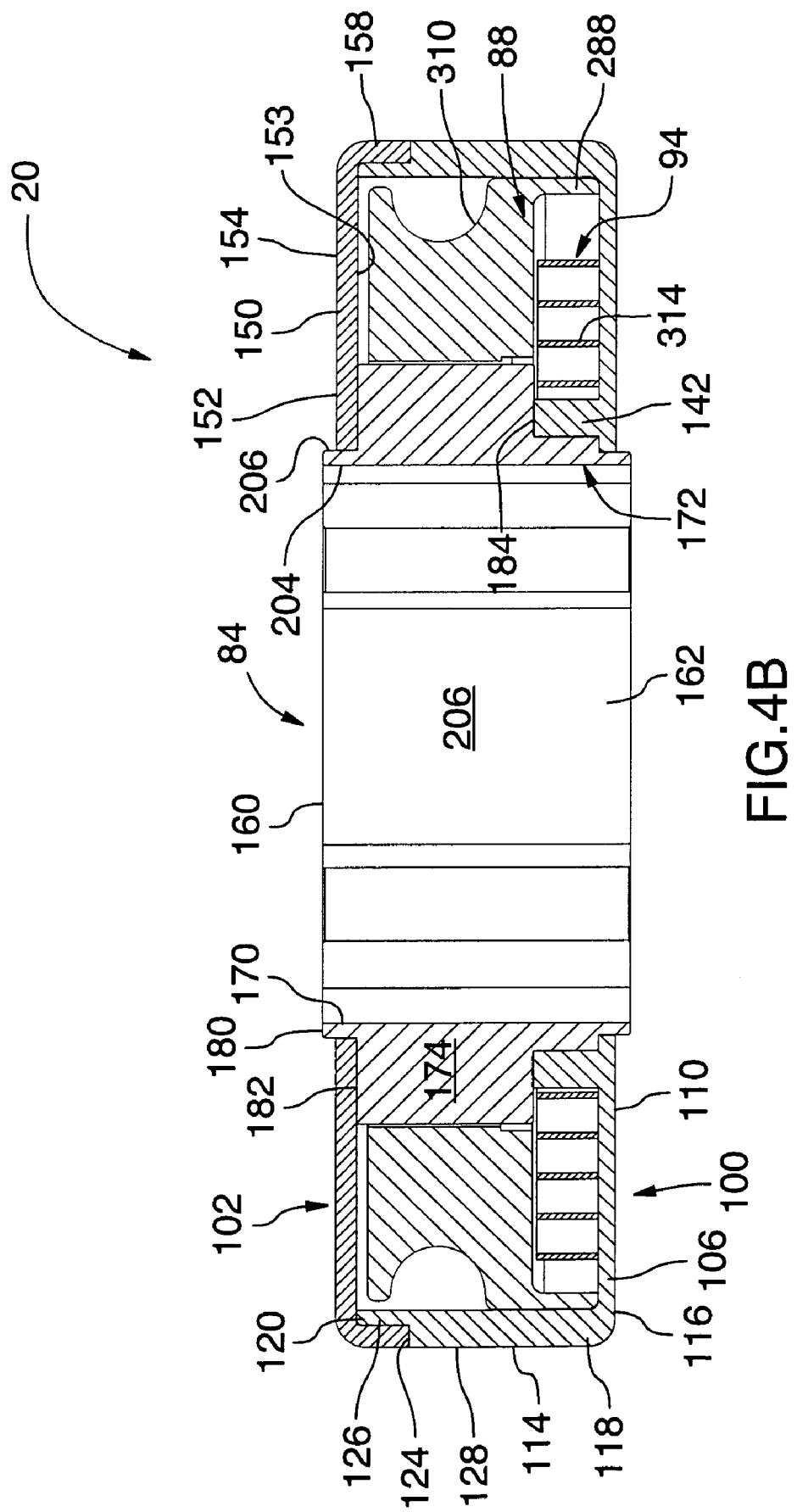
FIG. 4b is a cross-sectional view of the strap winding apparatus shown in FIG. 4a taken along the line '4a-4a'.

Referring to FIGS. 4b and 7, the second cover member 102 has a flanged annular body 150 that generally resembles the body 104 of the first cover member 100. The body 150 is defined at least partially by an end wall 152 having an inner face 153, an outer face 154 and a central aperture 156 formed therethrough, and a sidewall 158 projecting outwardly from the inner face 153 and extending circumferentially about the outermost radial edge 160 of the end wall 152. In like fashion to the central aperture 112, the central aperture 156 is sized larger than the diameter of the hub member 52.

In contrast to the sidewall 114, the sidewall 158 is relatively short and has a relatively constant wall thickness. The diameter of the sidewall 158 is sized slightly larger than the diameter of the circumferential lip 126 such that when the second cover member 102 is fit over the first cover member 100 a snug fit may be achieved. To prevent accidental detachment of the first and second cover members 100 and 102, the first cover member 100 may be releasably fastened to the second cover member 102 using screws or bolts. Alternatively, the cover members 100 and 102 may be permanently fastened to each other by gluing or ultrasonic welding or the like.

The cover members 100 and 102 may be fabricated from a hard, durable material, such as a molded plastic or metal, preferably selected for its strength, robustness and its ability to withstand impact. As well, the material used is preferably lightweight so as not to unduly affect the portability of the strap winding apparatus 20. Alternatively, the cover members could be constructed of aluminum or other lightweight metal or alloy.

With reference to FIGS. 7, 8a, 8b and 8c, the coupling ring 84 is now described in greater detail. The coupling ring 84 has a sleeve-like body 160 that is defined by a generally cylindrical sidewall 162 having a central aperture 164 extending therethrough. The cylindrical sidewall 162 includes a first sidewall end portion 170, an opposed second sidewall end portion 172 and an intermediate sidewall portion 174 disposed between the first and second end portions 170 and 172. While the cross-sectional area of the central aperture 164 remains constant throughout the entire length of the body 160, the outer diameter of the body 160 varies. More specifically, the outer diameter of the body 160 is greatest at the intermediate sidewall portion 174 and is decreased at both end sidewall portions 170 and 172 (as best shown in FIG. 4b).

At the first sidewall end portion 170, the wall thickness (as measured between the outer and inner sidewall surfaces 204 and 206) is relatively thin, thus defining a first lip 180. Where the first sidewall end portion 170 meets the intermediate sidewall portion 174, a first shoulder 182 is formed by the increased wall thickness. The wall thickness of the intermediate sidewall portion 174 remains constant, but thins again where the intermediate sidewall portion 174 joins the second sidewall end portion 172. At that juncture location, a second shoulder 184 is formed. Projecting outwardly from the second shoulder 184 is a flange 186. The flange 186 includes a proximal flange portion 188 and a distal flange portion 190 extending outwardly from the proximal flange portion 188. The wall thickness of the distal flange portion 188 is thinner than the wall thickness of the proximal flange portion 190. A third shoulder 192 marks the transition between the proximal flange portion 188 and the distal flange portion 190.

Figure 8A:
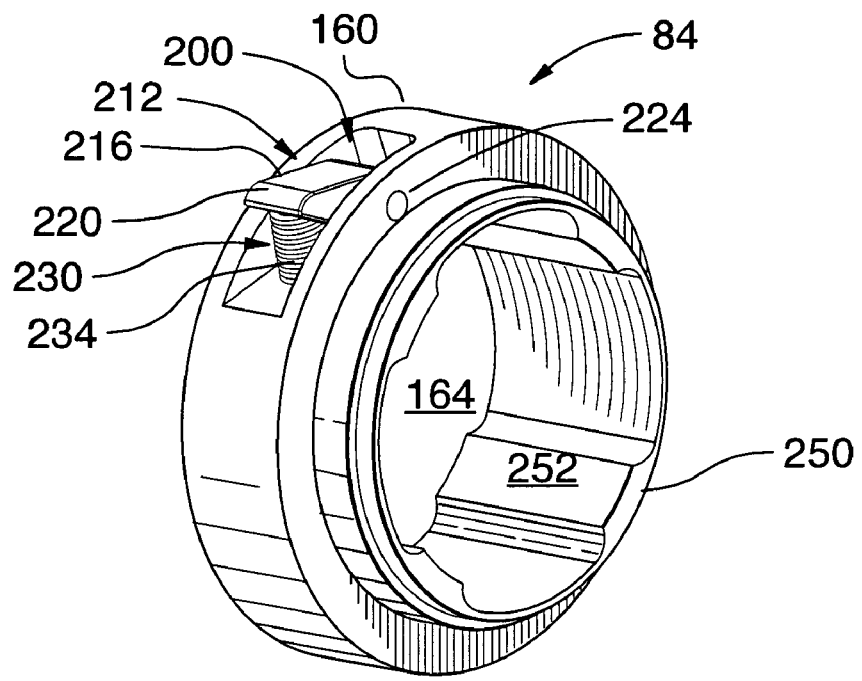
FIG. 8a is a perspective view showing in isolation the coupling member of the winding assembly illustrated in FIG. 7.
Figure 8B:
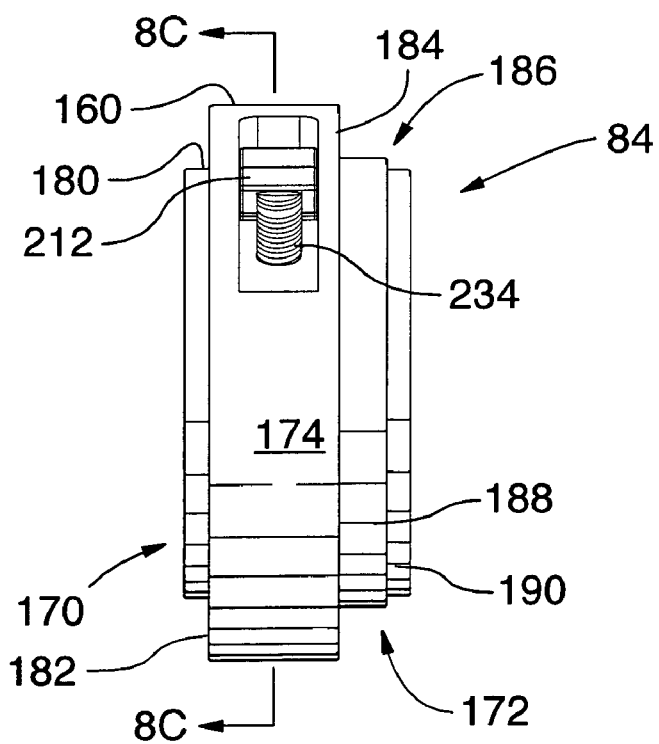
Figure 8C:
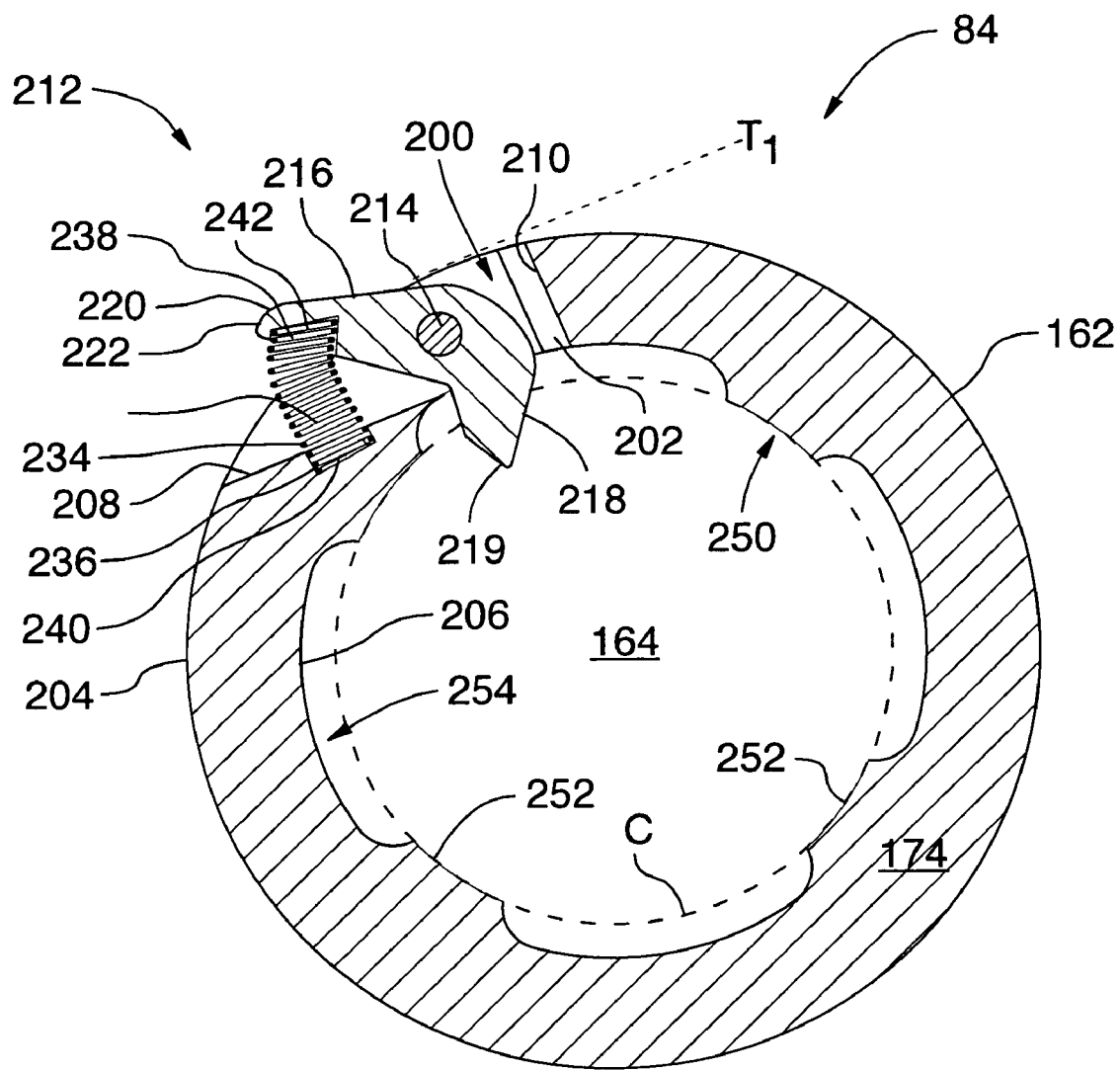
FIG. 8c is a cross-sectional view of the coupling member illustrated in FIG. 8b taken along line '8c-8c'.

A cutout 200 extends into the intermediate sidewall portion 174 between the outer sidewall surface 204 and the inner sidewall surface 206. The cutout 200 opens onto an aperture 202 which provides access to the central opening 164. When viewed in cross-section as shown in FIG. 8c, the shape of the cutout 200 can be seen to be defined at least partially by the contours of the outer and inner sidewall surfaces 204 and 206 and the faces 208 and 210 of the sidewall 162. The face 208 extends substantially parallel to a line $T_1$ (shown in dashed line in FIG. 8c) tangent to the curvature of the outer sidewall surface 204, while the face 210 has a slightly canted orientation relative to the face 208.

Accommodated at least partially within the cutout 200 is a generally L-shaped engagement member 212. The engagement member 212 is mounted on a pivot pin 214 supported at either end by portions of the sidewall 162. The engagement member 212 includes a first, relatively long arm 216 and a second, relatively short arm 218 connected to the first arm 216. At its distal end or tip 220, the first arm 216 terminates with a finger-like projection 222.

Figure 12:
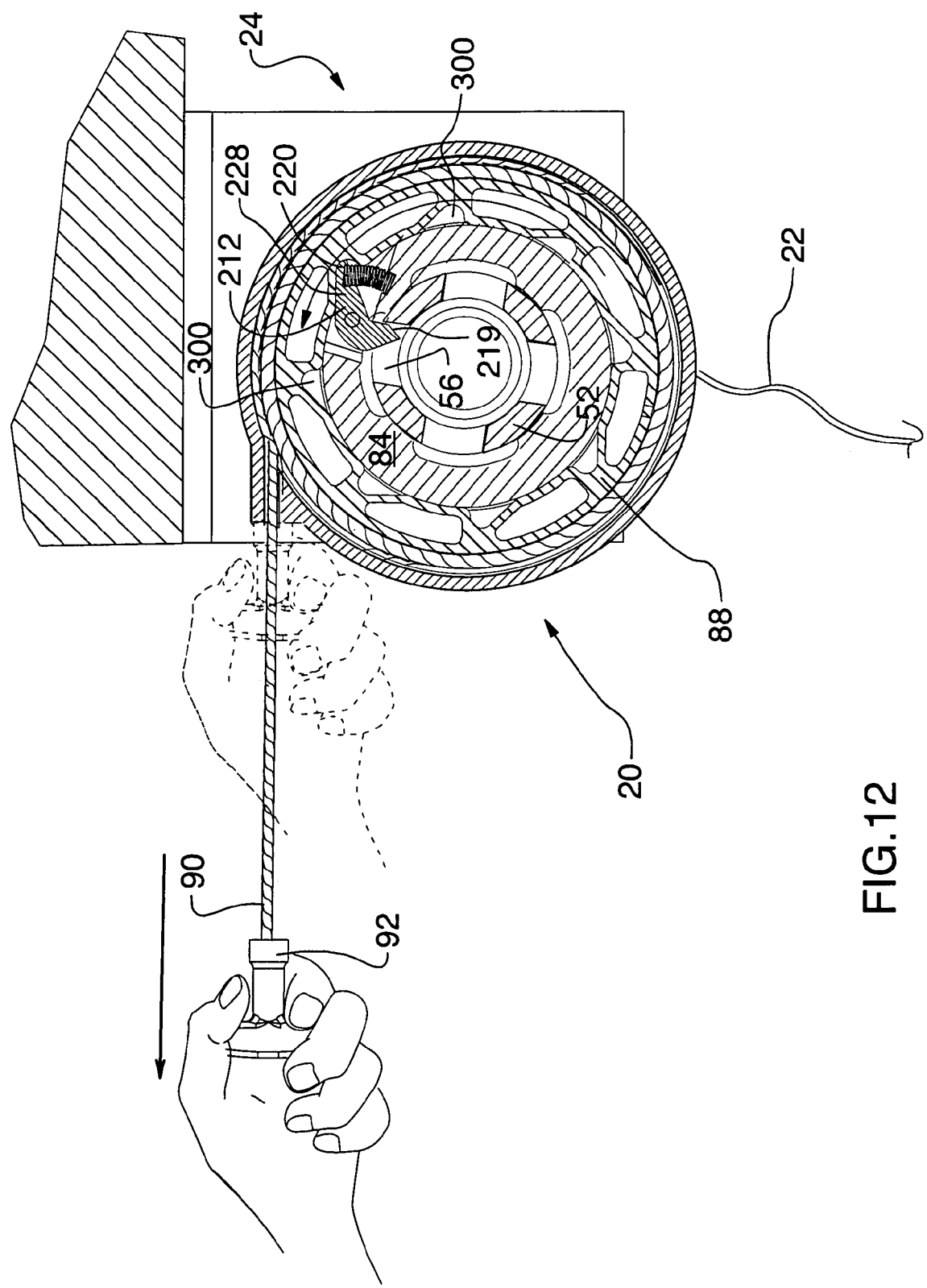
FIG. 12 is another cross-sectional view of the strap winding apparatus similar to that illustrated in FIG. 11, showing the handle and cord of the spool member being pulled and the spring-loaded engagement member of the coupling member being pivoted to an engaged position such that the coupling ring is now fixed for rotation with the spool member.

Adjacent the location where the first arm 216 joins the second arm 218, the engagement member 212 has a bore 224 defined therein which receives the pivot pin 214. The engagement member 212 is pivotable between a disengaged position 226 (shown in FIG. 11), and an engaged position 228 (as best shown in FIG. 12).

In the disengaged position 226, the tip 220 of the first arm 216 is fully or at least substantially contained within the cutout 200, but may bear against the inner radial surface 302 of the spool member 80. When the strap winding apparatus 20 is mounted onto the hub member 52 and the engagement member 212 is in the disengaged position 226, the tip 219 of the second arm 218 may abut the outer radial face 227 of the annular wall 54 or may only partially extend into one of the apertures 56 of the hub member 52.

In the engaged position 228, the tip 220 of the first arm 216 extends outwardly from the cutout 200 to engage a portion of the spool member 88. When the strap winding apparatus 20 is operatively coupled to the hub member 52 with the engagement member 212 pivoted to its engaged position 228, the distal end 219 of the second arm 218 extends substantially into the central aperture 164 for engagement with one of the apertures 56 of the hub member 52.

Biasing means 230 in the nature of a helical compression coil spring 234 is provided to bias the engagement member 212 toward the engaged position 228. The coil spring 234 has a first end 236 and a second end 238. The first end 236 of the coil spring 234 is seated within a blind bore 240 formed in the face 208. The second end 238 is received within a small rebate 242 defined in the finger-like projection 222 of the first arm 216. While in this embodiment, the biasing means 230 takes the form of a compression coil spring 234, it will be appreciated that this need not be the case in every application. In other embodiments, the biasing means could be configured differently. For instance, in one alternative embodiment, the coil spring could be replaced with a spring clip or other similar resilient compression member.

A plurality of circumferentially spaced projections 250 extend radially inward from the inner surface 204 of sidewall 162 into the central aperture 164. Each projection 250 has a slightly concave surface 252 that is configured to correspond substantially to the curvature of the annular wall 54 of the hub member 52. The concave surfaces 252 cooperate with each other to define a notional circle C (shown in dashed lines in FIG. 8c) whose diameter D is sized slightly larger than the diameter of the hub member 52. This configuration permits the hub member 52 to be received within the central aperture 164, when the strap winding apparatus 20 is coupled to the winch 24.

A relatively large indent or recess 254 is disposed between each pair of adjacent projections 250. The indents 254 provide additional clearance between the coupling ring 84 and the hub member 52. The clearance afforded by the indents 254 tends to be particularly useful in instances where the strap winding apparatus 20 needs to be coupled to a hub member 52 that may have sustained some damage resulting in its no longer having a perfectly circular cross-section. By virtue of their configuration, the indents 254 may tend to accommodate some of the irregularities in the shape of the hub member 52, thereby enhancing the overall versatility of the strap winding apparatus 20.

In the embodiment shown, the projections 250 are having slightly concave surfaces and are integrally formed with the sidewall 162. However, this need not be the case in every application. In an alternative embodiment, the projections could shaped differently and could be distinct components fastened to the sidewall 162. The projections in such an embodiment could be fabricated from a rigid or resilient material. When fabricated from a resilient material, the projections could provide a broader tolerance to accommodate deformations in the hub member 52. In still another embodiment, the projections could be configured to be retractable within the coupling ring. For instance, the projections could take the form of ball bearings, each outfitted with a spring-loaded mechanism to bias at least a portion of the ball bearing to protrude into the central aperture 164. Other modifications are also possible.

In the preferred embodiment, the coupling ring 84 has four projections 250 spaced at 90° degree intervals from each other. However, in other embodiments, a greater or lesser number of projections may be provided. For instance, in one alternative embodiment, two projections spaced at 180° degrees from each other and two similarly spaced indents may be used. In another embodiment, three, evenly spaced projections and indents could be employed to similar advantage.

In still another embodiment, an alternate coupling ring could be configured without any projections and/or indents. Such an alternate coupling ring is shown in FIGS. 16a, 16b and 16c.

The spool assembly 86 can be seen in FIG. 7. As previously mentioned, the spool assembly 86 includes the handle 92, the pull cord 90 and the spool member 88. As will be described in greater detail below, the handle 92 and the pull cord 90 together define a pull-type actuator that is used to urge the apparatus 20 to wind the elongate strap 22 onto the winch 24.

Figure 6:
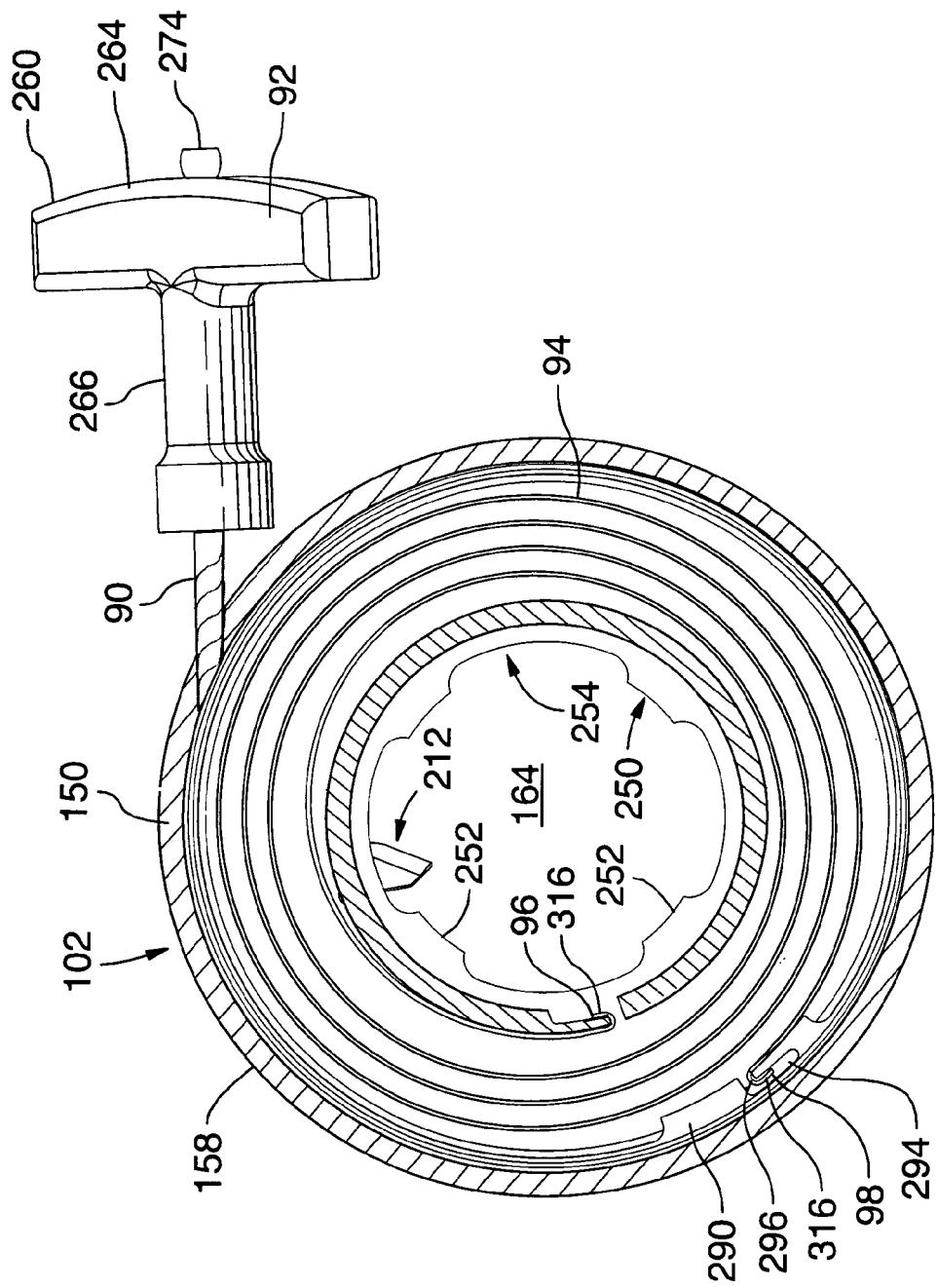
FIG. 6 is another end elevation view of the strap winding apparatus taken opposite to that shown in FIG. 5, with the end wall of the first cover member of the apparatus housing being omitted to reveal details of the internally housed winding assembly.

With reference to FIGS. 6 and 11, the handle 92 has a generally T-shaped body 262 formed by an elongate gripping portion 264 and a hollow shank portion 266 joined to the gripping portion 264 and extending perpendicularly therefrom. A bore 268 defined in the shank portion 266 receives therethrough a portion of the pull cord 90. In this embodiment, the gripping portion 264 and the shank portion 266 are of one-piece construction and are fabricated from a hard, durable, impact and wear resistant plastic. In an alternative embodiment, the gripping portion and the shank portion could be two separate components fastenable one to the other and could be made of different materials. Optionally, the gripping portion 264 could be provided with a textured surface, projections or rebates to enhance gripping of the handle 92.

The pull cord 90 has a inner end (not shown) that is tied to the spool member 88 and an outer end 272 which is connected to the handle 92. Securely anchored to the outer end 272 of the pull cord 90 is a fitting 274. The fitting 274 is sized larger than the diameter of the bore defined in the shank portion 266 so as to prevent the outer end 272 from passing through the bore and the pull cord 90 becoming detached from the handle 92 when pulled. The pull cord 90 could also be fastened to the handle in other ways, such as with the use of clamping elements.

While in the preferred embodiment, the pull cord 90 is a heavy duty braided nylon cord with high tensile strength characteristics. In alternative embodiments, the cord 90 could be made with other suitable materials. In still other embodiments, the cord 90 could be replaced with a steel cable or the like.

The length of the pull cord 90 is such that the cord 90 may be wound about the spool member 88 at least two times. In this embodiment, the length of the pull cord 90 measures 44 inches, but may be modified to suit a particular application.

Figure 9A:
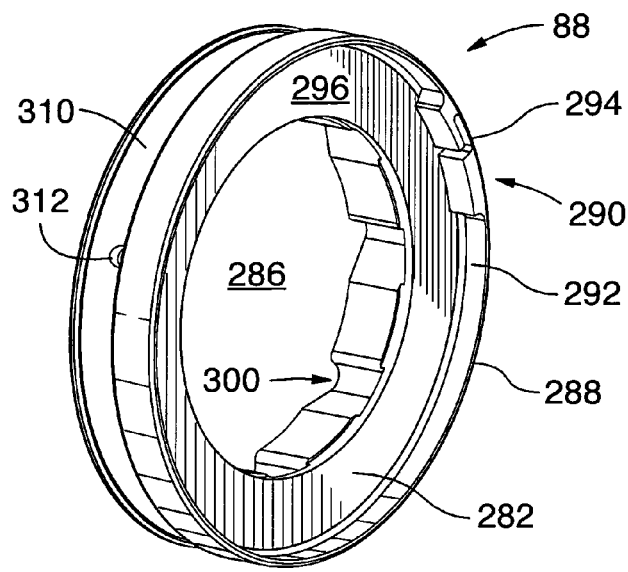
FIG. 9a is a perspective view showing in isolation the spool member of the winding assembly illustrated in FIG. 7, with the handle and cord thereof omitted for clarity.
Figure 9B:
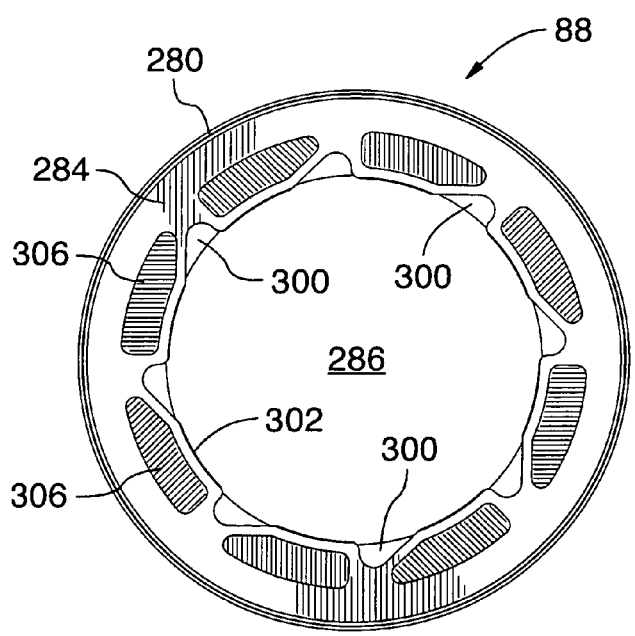
FIG. 9b is an end elevation view of the spool member shown in FIG. 9b.
Figure 9C:
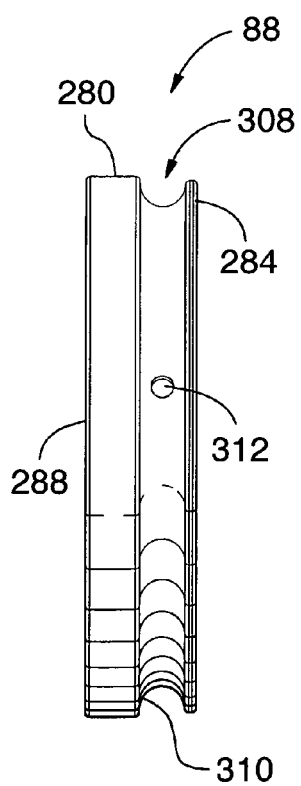
Figure 10:
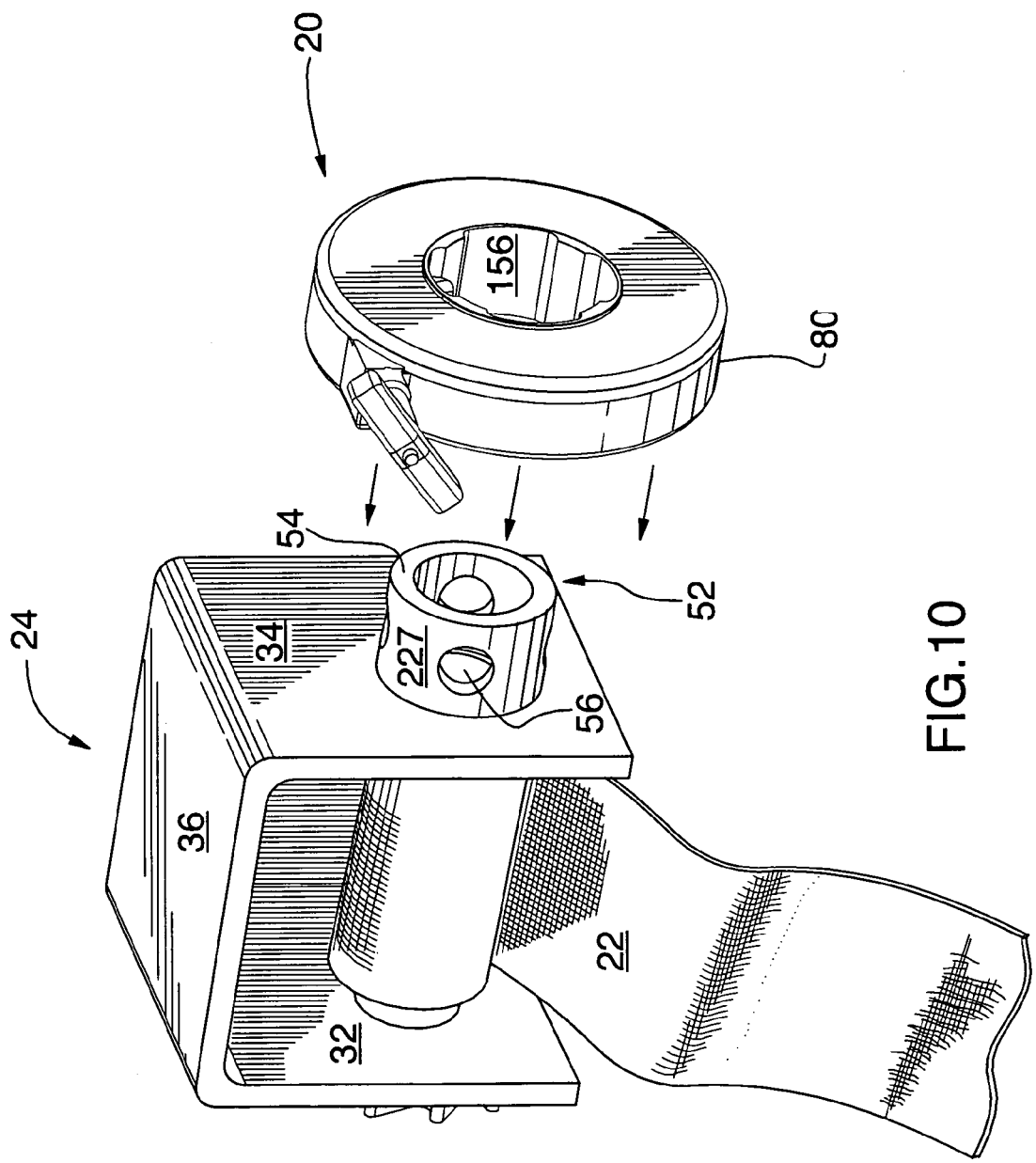
FIG. 10 is a front left perspective view similar to that shown in FIG. 3a, except that the strap winding apparatus is shown decoupled and spaced apart from the winch.

Referring now to FIGS. 9a, 9b and 9c, there is shown the spool member 88. The spool member 88 has a generally annular body 280 provided with a first side 282, a second opposite side 284 and a central aperture 286 extending therethrough. The central aperture 286 is sized to receive the coupling ring 84 therein. Projecting outwardly from the first side 282 and running circumferentially about the outermost radial edge of the annular body 280 is a flange 288. The flange 288 has a block-like projection 290 that extends radially inward from the inner flange surface 292. A portion of the block-like projection 290 is cutout to define a generally L-shaped slot or passage 294 and a finger-like catch 296 (see FIGS. 6 and 9a). When connecting the spiral torsion spring 94 to the spool member 88, the second outer end 98 of the spiral torsion spring 94 is introduced within the slot 294 and retained by the catch 296.

Turning now to FIG. 9b, on the second side 284 thereof, the annular body 280 has a plurality of generally V-shaped grooves or notches 300 disposed at circumferentially spaced locations. The notches 300 are cut into the inner radial edge 302 of the annular body 80 and are configured to correspond generally to the shape of the tip 220 of the engagement member 212. Together the notches 300 and the engagement member 212 define an indexed mating means that is operable to fix the coupling ring 84 for rotation with the spool member 88 at a predetermined angular position selected from a set of discrete angular positions relative to the spool member 88. In this regard, each notch 300 functions as an indexing notch and corresponds to one of the predetermined angular positions. Moreover, in this arrangement, the tip 220 of the engagement member 212 acts as an indexing pin engageable with the indexing notches.

In the preferred embodiment, the annular body 280 is provided with eight notches 300 spaced 45° degrees from each other. It will however be appreciated that in other embodiments, the annular body could be configured with a greater or lesser number of notches.

In this embodiment, the spool member 88 is fabricated from molded plastic. To facilitate cooling of the plastic after molding, the second side 284 of the annular body 280 is formed with a plurality of elongate, generally bullet-shaped hollows or cavities 306 (best shown in FIG. 9b). The cavities 306 are disposed circumferentially along the annular body 280 with each cavity 306 positioned between a pair of adjacent notches 300. Additionally, the provision of cavities 306 can serve a weight-reducing function in that it may reduce the weight of the spool member 88 and generally improve the portability of the strap winding apparatus 20.

In the present embodiment, eight cavities are formed in the annular body 280. In alternative embodiments, a greater or lesser number of cavities may be provided and such cavities could be configured to have a different shape. Further still, the spool member 88 may be configured without any such cavities (see, for example, the alternate spool member shown in FIG. 18b and described in greater detail below).

As best shown in FIG. 9c, a groove 308 extends between the first and second sides 282 and 284 and along the peripheral edge of the annular body 280 to define a generally concave surface 310. When the pull cord 90 is stored on the spool member 88 it is wound onto the concave surface 310. A hole 312 is formed in the concave surface 310 through which the inner end of the pull cord 90 may be introduced to allow the cord 90 to be securely fastened to the spool member 88.

Referring to FIG. 7, the spiral torsion spring 94 resembles a typical spiral torsion spring. It has a plurality of coils 314—each coil 314 nesting inside the next coil 314 of increasing diameter. The smallest of the coils 314 is sized slightly larger than the diameter of the flange member 142 of the first cover member 100. The inner and outer ends 96 and 98 of the spiral torsion spring 94 are each bent back on themselves to form a hook 316 adapted to engage the catches 148 and 296.

Figure 14:
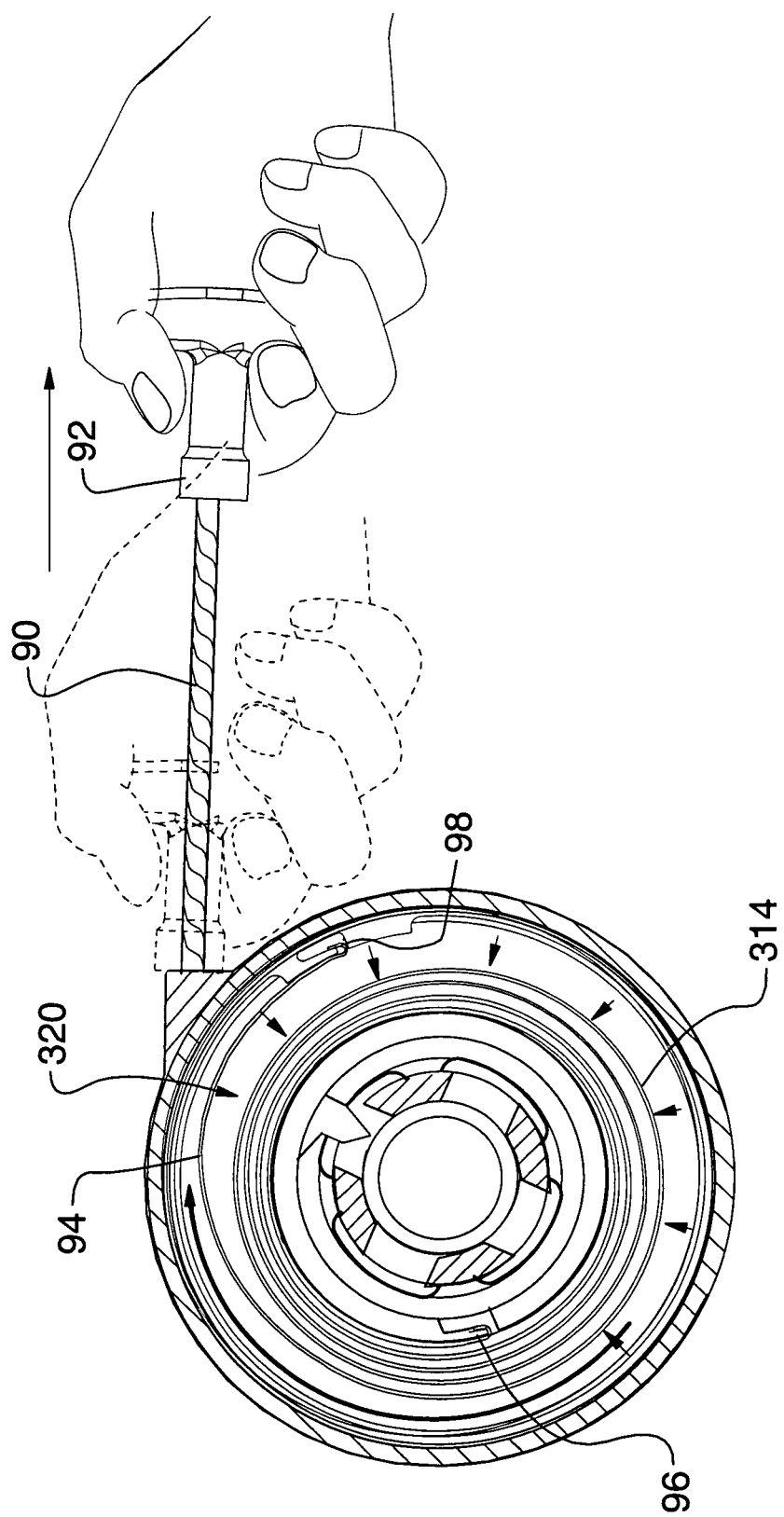
FIG. 14 is another cross-sectional view of the strap winding apparatus taken from an end opposite to that illustrated in FIG. 13, showing the spiral torsion spring moved to a loaded or at least partially loaded position.
Figure 15:
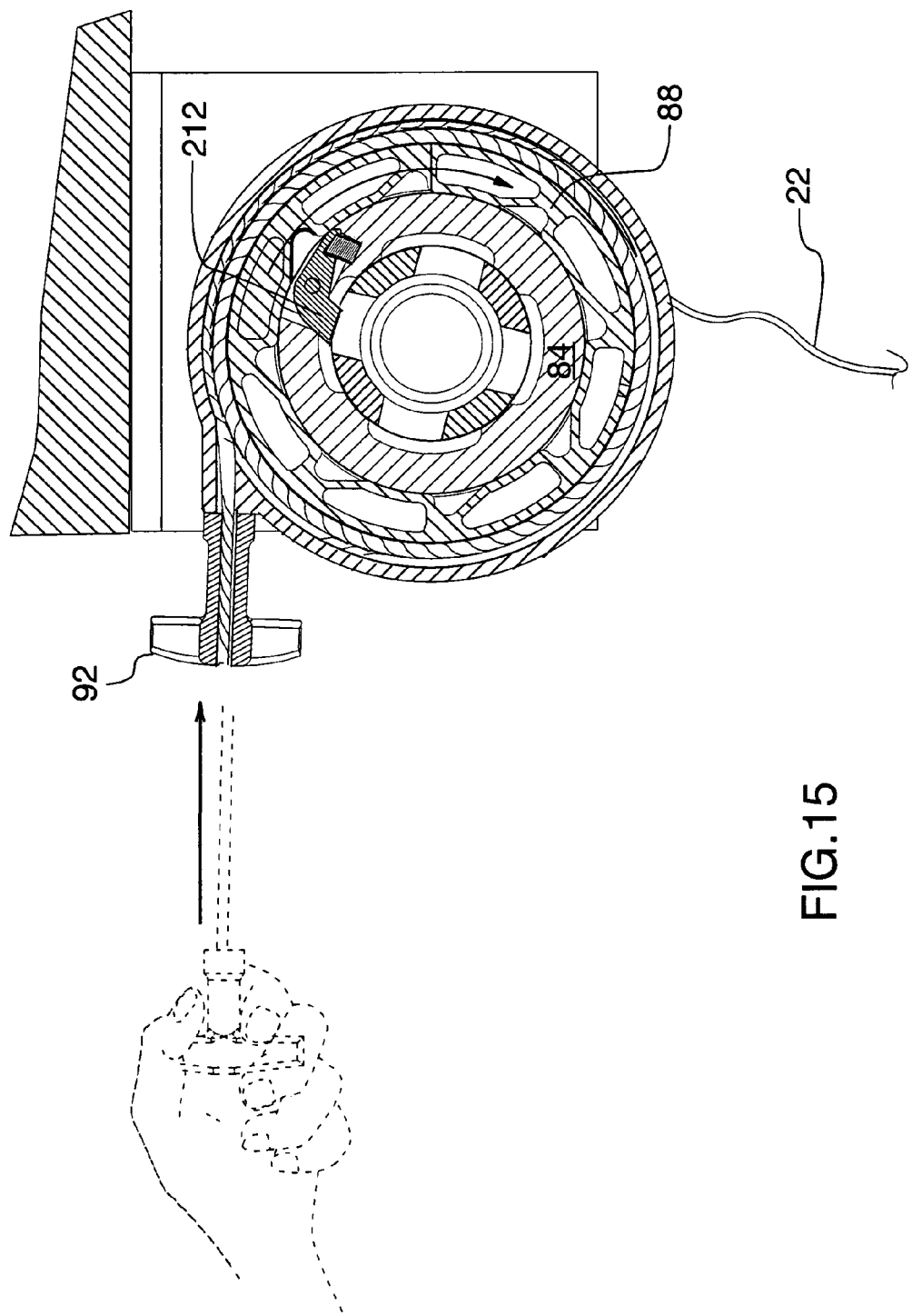
FIG. 15 is another cross-sectional view of the strap winding apparatus similar to that illustrated in FIG. 13, except that it shows the handle being released, the spring-loaded engagement member of the coupling member being pivoted to a disengaged position, and the cord being retracted into the winding assembly and wound about the spool member.

Once operatively installed in the winding assembly 82, the torsion spring member 94 will be movable between a released or unloaded position 318 (shown in FIG. 6) and a loaded position 320 (shown in FIG. 14). When moved from the released position 318 to the loaded position 320, the diameter of the nested coils 314 decrease as the coils 314 become more tightly wound and the torsion spring member 94 stores spring energy. In this embodiment, the spiral torsion spring 94 may be loaded by subjecting the spring 94 to a counterclockwise torque. Correspondingly, the application of a clockwise torque when the spring 94 is in its loaded position 320, will urge the spring 94 to return or move to its unloaded position 320 thereby releasing its spring energy. As will be explained in greater detail below, the spiral torsion spring 94 serves to automatically rewind the pull cord 90 about the spool member 88 when the handle 92 is released by the user.

In the preferred embodiment, the spiral torsion spring 94 is made of high carbon steel. In other embodiments, the spiral torsion spring could be fabricated from other suitable materials.

Having described the various components of the strap winding apparatus 20, what follows next is an exemplary description of the manner and sequence in which these components may be assembled to each other. As shown in FIG. 5, the spiral torsion spring 94 is placed onto the first cover member 100 with its coils 314 surrounding the flange member 142. The hook 316 formed at the inner end 96 of the torsion spiral spring 94 is inserted through the gap G in the flange member 142 and urged into engagement with the catch 148. Next, the spool member 88 is placed over top the spiral torsion spring 94. The outer end 98 of the spiral torsion spring 94 is introduced through slot 294 and the hook 316 is urged into engagement with the catch 296 (see FIG. 6). Thus arranged, the spiral torsion spring 94 is in its unloaded position 320 and is captively retained between the spool member 88 and the first cover member 100—the spring 94 being bound by the end wall 106 and flange member 142 of the first cover member 100 and the flange 288 and second side 284 of the annular body 280 (as best shown in FIG. 4b).

With the spool member 88 in place, the inner end 270 of the cord 90 is led through the hole 312 defined in the concave surface 310 of the spool member 88 and secured to the spool member 88 so as to prevent accidental detachment therefrom. Thereafter, the pull cord 90 is wound tightly about the concave surface 310 and the outer end 272 thereof is pulled through the passage 138 defined in the reinforced sidewall portion 130 of the first cover member 100. The outer end 272 of the cord 90 is then led through the hollow shank portion 266 of the handle 92 and fixedly attached to the gripping portion 264.

The coupling ring 84 is then fitted into the central aperture 286 of the spool member 88 such that the second shoulder 184 of its sleeve-like body 160 is supported on the flange member 142 and the third shoulder 192 abuts the inner face 108 of the first cover member 100. With the coupling ring 84 arranged in this fashion, the engagement member 212 is in its engaged position 228 that is, its tip 230 extends substantially into the central aperture 164.

Thereafter, the housing 80 is sealed by placing the second cover member 102 over top the winding assembly 82 such that the inner face 153 of the second cover member 102 abuts the first shoulder 182 of the sleeve-like body 160 and the sidewall 158 of the second cover member 102 is urged to snugly engage the circumferential lip 126 of the first cover member 100. When sealed in this manner, the housing 80 provides excellent protection to the winding assembly 82 preventing dust, dirt, debris or moisture from penetrating and possibly interfering with the proper functioning of the winding assembly 82. This protection is further enhanced by having the first lip 180 of the coupling ring 84 abut the innermost edge of the end wall 152 and extend beyond the outer face 154 of the second cover member 102 and similarly, by having the distal flange portion 190 abut the innermost edge of the end wall 106 and extend beyond the outer face 110 of the first cover member 100.

An exemplary use of the strap winding apparatus 20 to wind the elongate strap 22 onto the winch 24 is now described with reference to FIGS. 10 to 15. To couple the strap winding apparatus 20 onto the winch 24, the operator or user orients the housing 80 such that the handle 92 is pointed away from the vehicle 26 in a direction generally parallel to the road surface, and aligns the aperture 164 defined in the coupling ring 84 with the hub member 52 (see FIG. 10). Thereafter, the coupling ring 84 is urged against the hub member 52 such that the hub member 52 is received within the aperture 164 and the concave surfaces 252 of the projections 250 are urged to abut the annular wall 54.

At this time, the engagement member 212 is in its disengaged position 226, with the distal end 219 of the second arm 218 either abutting the outer radial face 227 of the annular wall 54 or engaged within one of the apertures 56 defined therein. If the distal end 219 is positioned so as to abut the outer radial face 227, the user rotates the housing 80 about the hub member 52 until the distal end 219 partially engages, or is partially received within, an aperture 56 (see FIG. 11). When in this position, the finger-like projection 222 is fully or at least partially contained within the cutout 200 defined in the coupling ring 84 and bears against the inner radial surface 302 of the spool member 80.

Thus coupled to the winch 24, the strap winding apparatus 20 is ready to be actuated. As shown in FIG. 12, the user grasps the handle 92 with one hand and pulls it outwardly away from the vehicle 26, thereby causing the pull cord 90 to unwind from the spool member 88 which, in turn, urges the spool member 88 to rotate in a counterclockwise rotation about the axis H-H of the winch 24. As the spool member 88 rotates, one of the notches 300 will be moved into position so as to allow the finger-like projection 222 to be received therein. The engagement member 212 is urged to pivot to its engaged position 228 and to project outwardly from the cutout 200 for receipt into the notch 300. When pivoted to the engaged position 228, the distal end 219 extends more substantially into the apertures 56. Thus arranged, torque applied in the counterclockwise direction to the spool member 88 may be transferred to the coupling ring 84.

Figure 13:
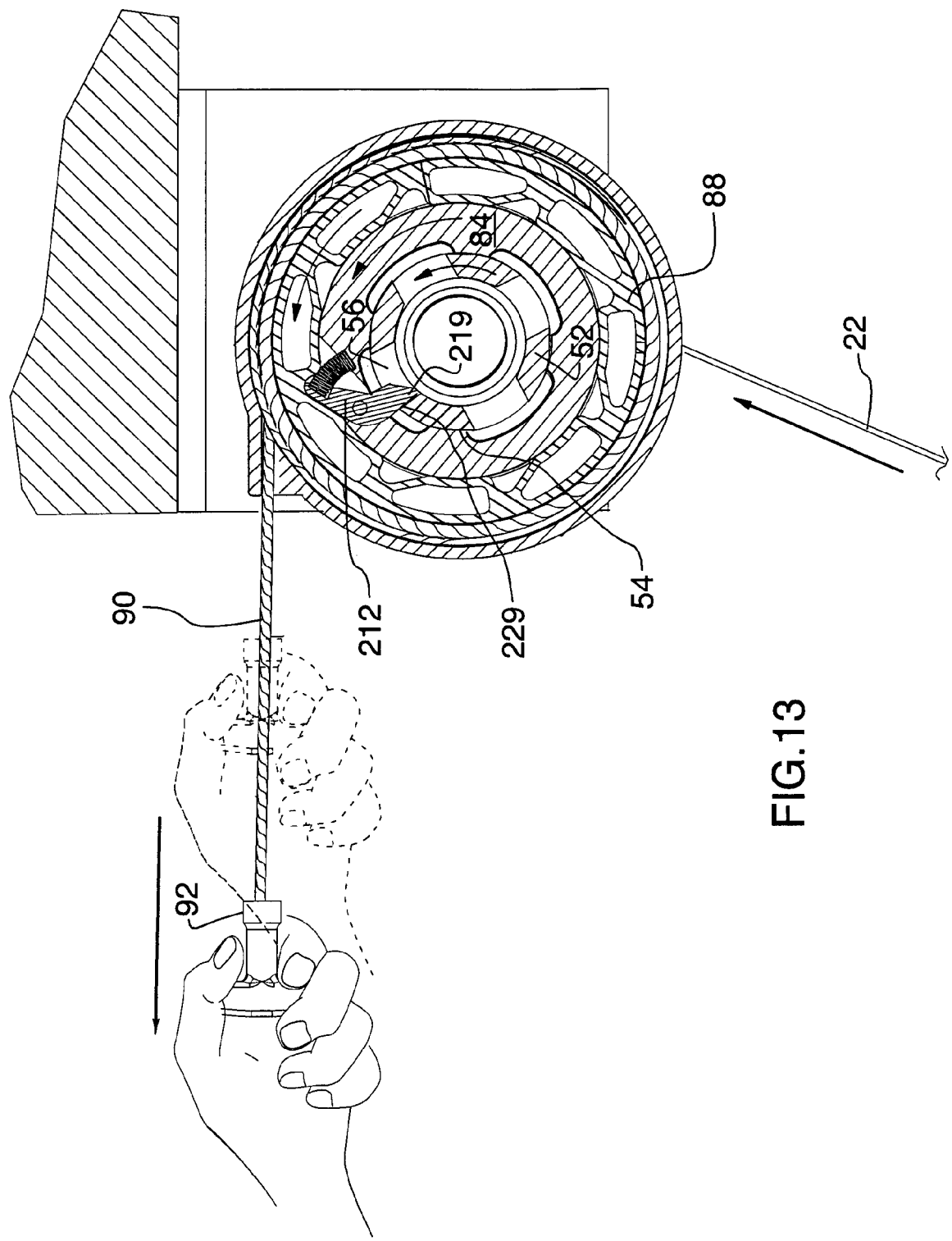
FIG. 13 is another cross-sectional view of the strap winding apparatus similar to that illustrated in FIG. 11, showing the handle and cord of the spool member being further pulled, one end of the spring-loaded engagement member abutting the inner edge of the annular wall such that the hub member is fixed for rotation with the coupling member and the strap being wound about the reel member of the winch.

Upon further rotation of the spool member 88, the tip 20 of the engagement member 212 will be urged to bear against the inner edge 229 of the annular wall 54 (as shown in FIG. 13). Once this occurs the coupling ring 84 and the hub member 52 are fixed or coupled to each other for rotation such that any further counterclockwise rotation of the coupling ring 84 will be imparted to the hub member 52 as well.

As the spool member 88 continues to rotate, the torque generated is transferred to the hub member 52 via the coupling ring 84 (see FIG. 13). As a result, the reel member 40 is urged to rotate in a counterclockwise direction (i.e. the winch take-up direction) about the H-H axis, thereby causing the elongate strap 22 to be wound about the reel member 40.

Turning now to FIG. 14, it will appreciated that the rotation of the spool member 88 also serves to load the spiral torsion spring 94 with spring energy. More specifically, as the spool member 88 rotates in the counterclockwise rotation, the spiral torsion spring 94 stores spring energy as it moves from its released position 318 to its loaded position 320.

When the full length of the pull cord 90 has been unwound from the spool member 88, the user releases the handle 92. In the absence of a force acting on the spool member 88 to counteract the spring force in the torsion spring 94, the spring 94 seeks to return to its released position 318. As it does so, it releases its spring energy and applies a clockwise torque on the spool member 88 which causes the pull cord 90 to automatically and rapidly wind about the spool member 88 (see FIG. 15). At this stage, no torque is transmitted to the coupling ring 84 or the hub member 52 because the clockwise rotation of the spool member 88 causes the engagement member 212 to move to its disengaged position 226.

Once the pull cord 90 has been fully retracted into the housing 80 and wound completely about the spool member 88, the strap winding assembly 20 is ready to be actuated again. Depending on the length of the strap 22, it may be necessary to repeat the foregoing operation a number of times to wind the entire length of strap 22 onto the winch 24. In one exemplary embodiment where the length of the strap is 25 feet, the foregoing operation is repeated ten times.

When the strap 22 has been entirely wound about the winch 24, the strap winding apparatus 20 may be decoupled from the winch 24 by rotating the housing 80 about the H-H axis in the clockwise direction to cause the engagement member 212 to disengage from the hub member 52. More specifically, this action causes the distal end 219 to pivot out of the aperture 56 thereby making it possible to disconnect the strap winding apparatus 20 from the hub member 52. The strap winding apparatus 20 may thus be pulled away from the winch 24 and coupled to another winch whose strap is in need of winding. In this way, the strap winding apparatus 20 may be successively deployed to wind straps of each winch of the vehicle 26.

From the foregoing, it will be appreciated that the strap winding apparatus 20 is safe and relatively easy to use and can be operated with only one hand to advantageously wind a length of strap 22 quickly about a winch 24 with relatively little physical effort. As a result, significant savings in both time and effort can be achieved using this apparatus 20. By virtue of its relatively compact and lightweight design, the strap winding apparatus 20 tends to be very portable and may be conveniently stored on board the vehicle 26 when not in use. Moreover, its rugged construction tends to make it well-suited for repeated use and tends to provide the strap winding apparatus 20 with improved wear resistance.

Figure 16:
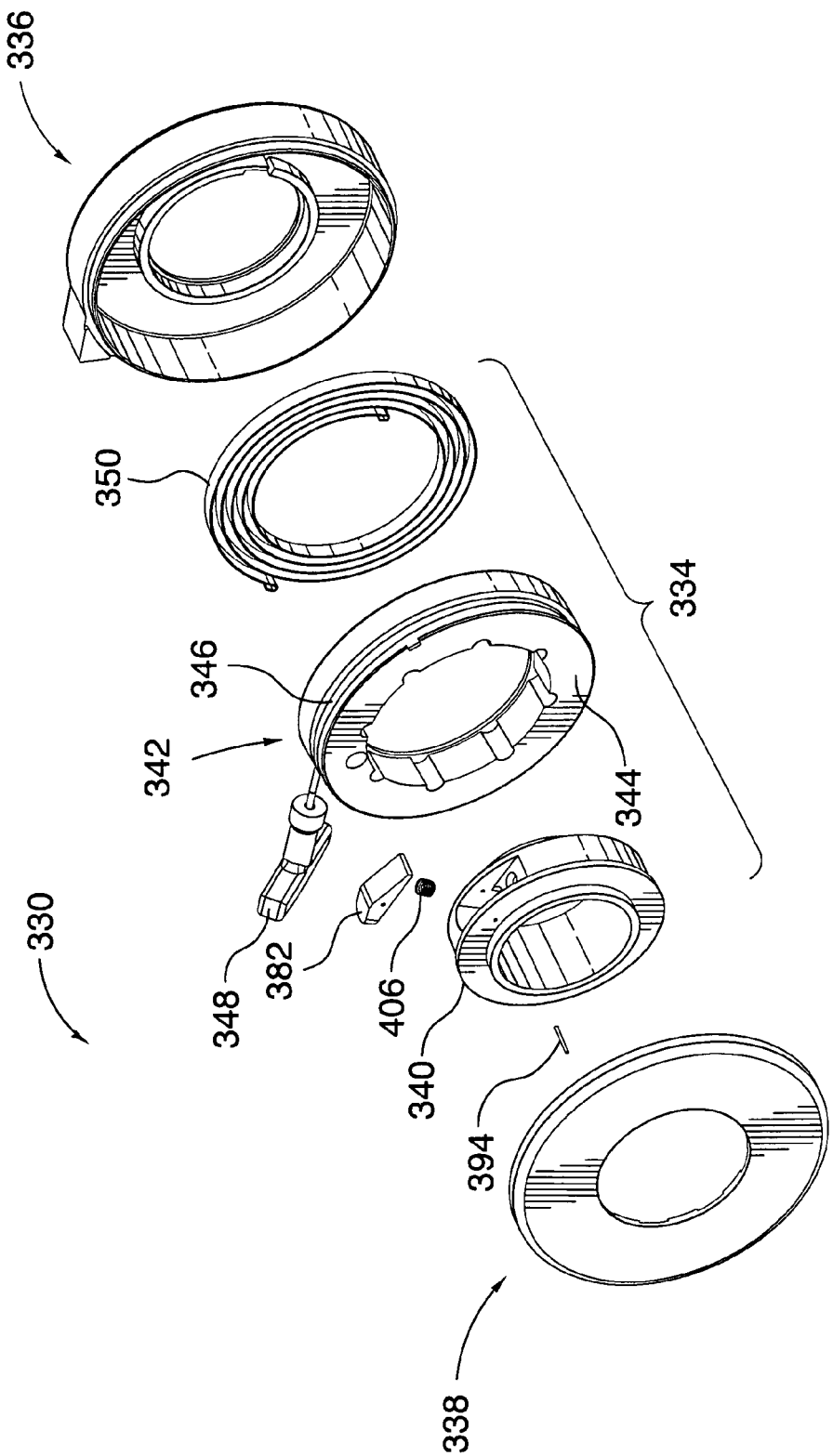
FIG. 16 is an exploded, perspective view of alternate strap winding apparatus to that shown in FIG. 7 in accordance with another embodiment of the invention.

Turning now to FIG. 16, there is shown an alternate strap winding apparatus in accordance with another embodiment of the invention, designated generally with reference numeral 330. Strap winding apparatus 330 is generally similar to strap winding apparatus 20 in that it also has a protective housing 332 and a winding assembly 334 retained within the housing 332. The housing 332 has a first cover member 336 and a second cover member 338, these members so closely resemble their counterpart components in the housing 80 (i.e. first and second cover member 100 and 102) that no further description is required. In like fashion to the winding assembly 82, the winding assembly 334 includes a coupling ring 340, a spool assembly 342 having a spool member 344, a cord 346 and a handle 348, and a spiral torsion spring 350. In this embodiment, the coupling ring 340 and the spool member 344 differ from their counterpart components in the winding assembly 80, but the cord 346, the handle 348 and the spiral torsion spring 350 remain substantially the same.

Figure 17A:
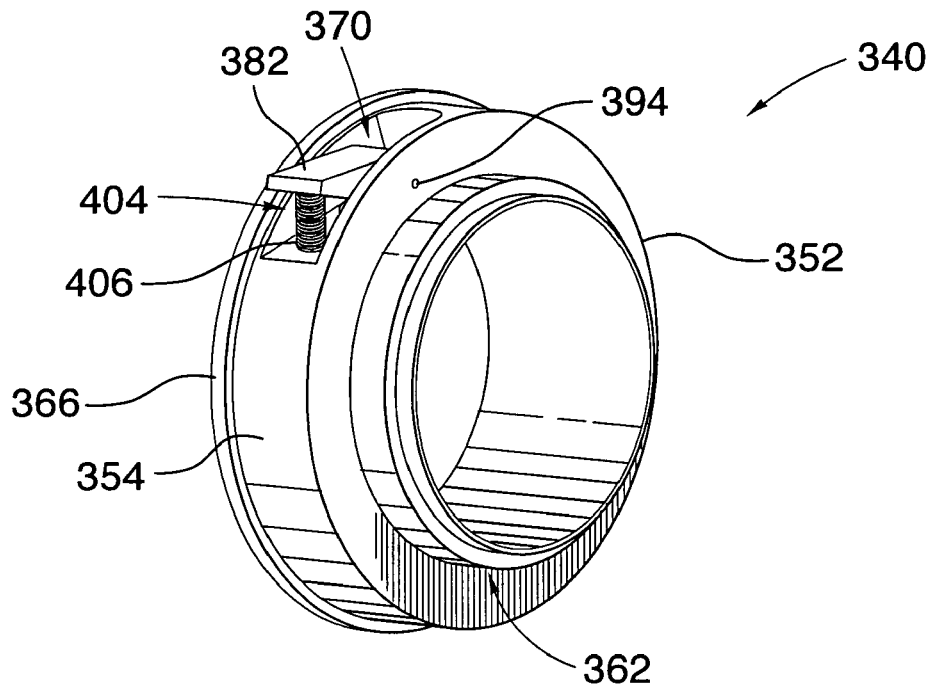
FIG. 17a is a perspective view showing in isolation the coupling member of the winding assembly illustrated in FIG. 16.
Figure 17B:
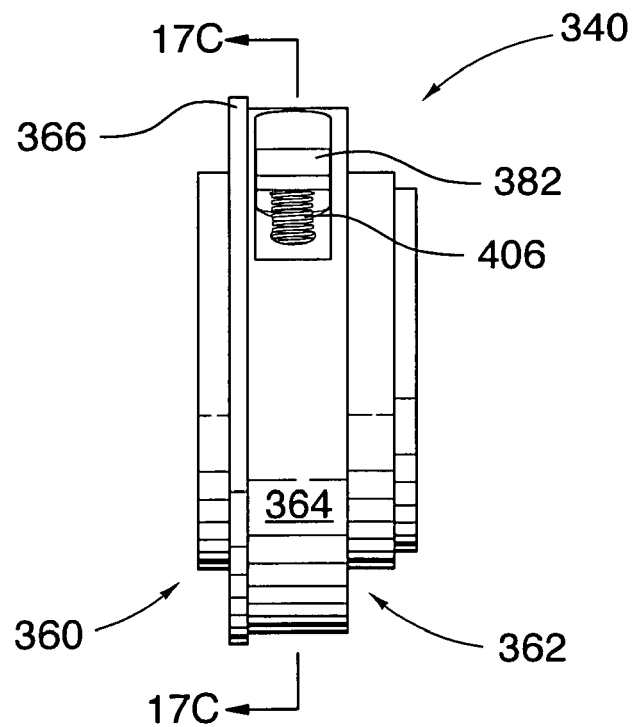
Figure 17C:
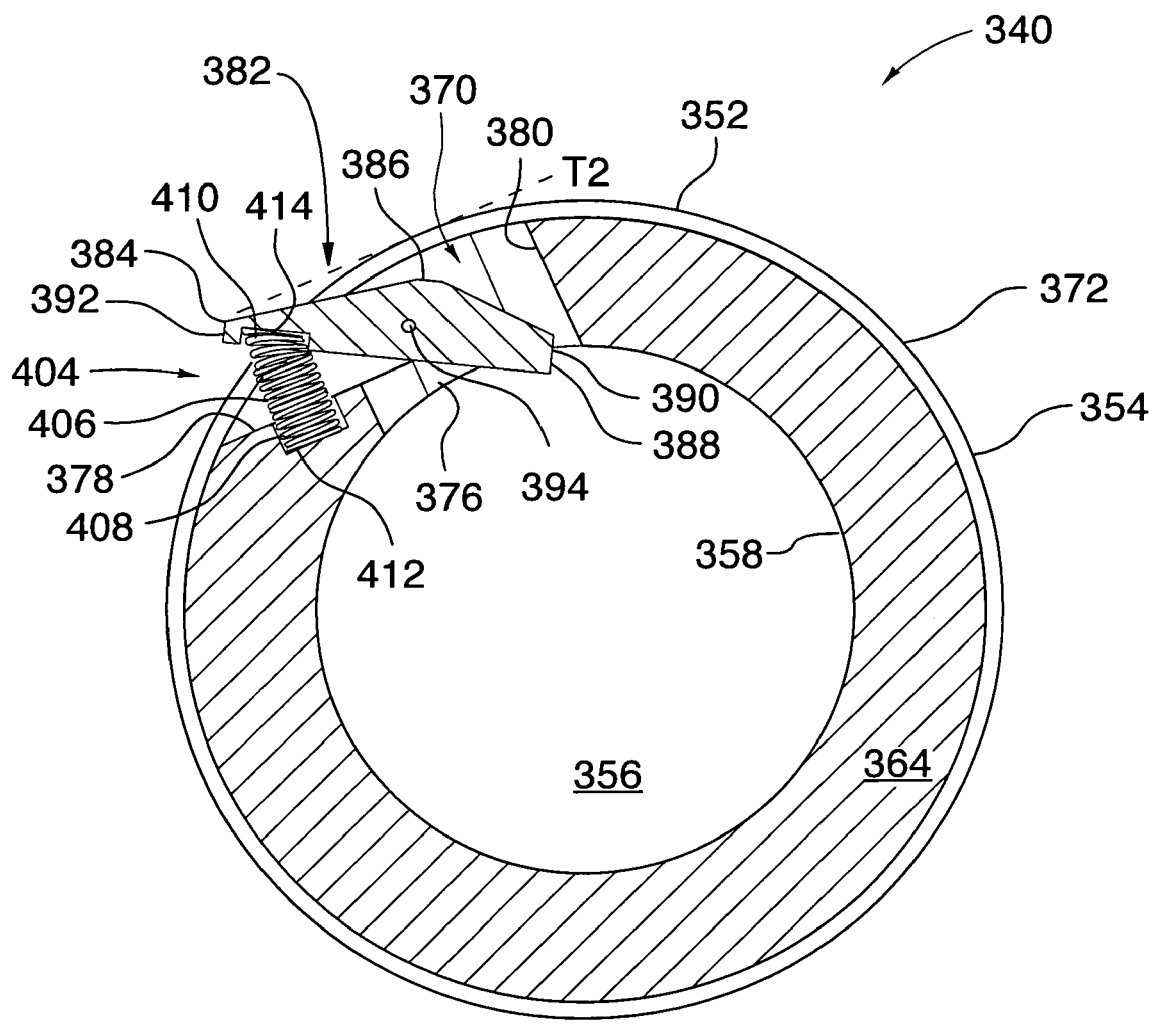
FIG. 17c is a cross-sectional view of the coupling member illustrated in FIG. 17b taken along line '17c-17c'.

With reference to FIGS. 17a, 17b and 17c, the coupling ring 340 is generally similar to the coupling ring 84 in that it too has a sleeve-like body 352 that is defined by a generally cylindrical sidewall 354 with a central aperture 356 extending therethrough. The central aperture 356 is bound by the inner surface 358 of the sidewall 354. However, in contrast to the central aperture 164 shown in FIG. 8c, the central aperture 356 has a substantially circular shape as shown in FIG. 17c and is sized relatively smaller than the central aperture 164 to more closely correspond to the diameter of the hub member 52.

In like fashion to the sidewall 162 of the sleeve-like body 160, the sidewall 354 includes a first sidewall end portion 360, an opposed second sidewall end portion 362 and an intermediate sidewall portion 364 disposed between the first and second end sidewall portions 360 and 362 (see FIG. 17c). Each sidewall portion 360, 362, 364 is configured to generally resemble its counterpart sidewall portion 170, 172, 174 shown in FIG. 8b, except that in this alternate embodiment, the intermediate sidewall portion 364 has, adjacent the location where the first sidewall end portion 360 meets the intermediate sidewall portion 364, a small lip 366 projecting radially outward. Beyond the lip 366, the intermediate sidewall portion 364 maintains a constant wall thickness.

The coupling ring 340 also includes a cutout 370 that extends into the intermediate sidewall portion 364 between the outer sidewall surface 372 and the inner sidewall surface 358. The cutout 370 opens onto an aperture 376 which provides access to the central opening 356. When viewed in cross-section as shown in FIG. 17c, the shape of the cutout 370 generally resembles that of cutout 220 in that it can be seen to be defined at least partially by the contours of the outer and inner sidewall surfaces 372 and 358 and faces 378 and 380 of the sidewall 354. Similar to the face 208, the face 378 extends substantially parallel to a line $T_2$ (shown in dashed line in FIG. 17c) tangent to the curvature of the outer sidewall surface 372. However, in this embodiment, the face 380 is oriented perpendicular to the face 378.

In like fashion to the cutout 200, the cutout 370 also accommodates an engagement member 382. However, the engagement member 382 is shaped differently than the engagement member 212. Instead of being L-shaped, the engagement member 382 is shaped like an isosceles triangle with truncated corners 384, 386 and 388, as best shown in FIG. 17c. The corner 388 is more truncated than the others and defines a first end 390 of the engagement member 382, while the opposing corner 384 defines the second end 392 of the engagement member 382. The pivot pin 394 which supports the engagement member 382 is disposed between the first and second ends 390 and 392, slightly offset from the circumcenter of the notional triangle at least partially defined by the corners 384, 386 and 388.

Figure 19:
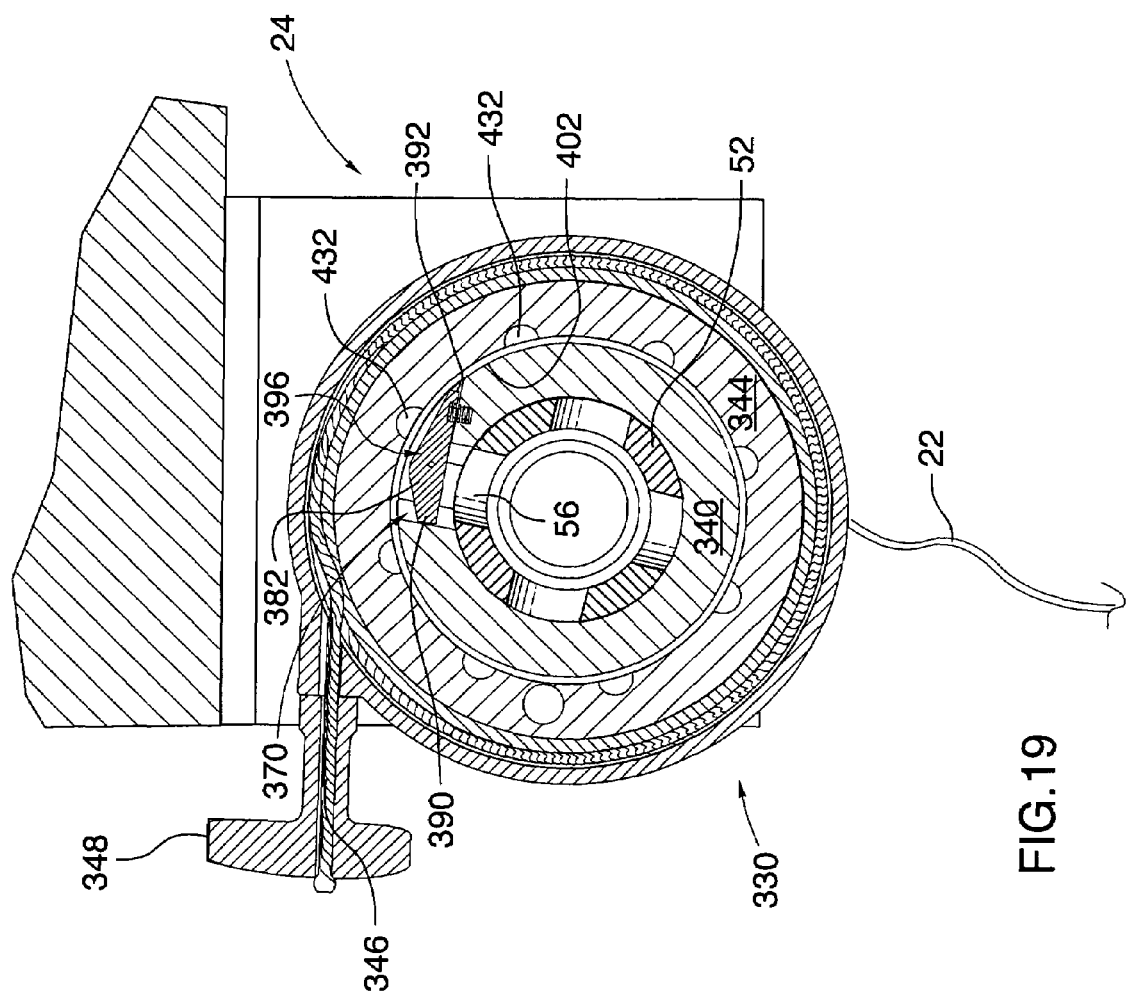
FIG. 19 is a cross-sectional view of the strap winding apparatus illustrated in FIG. 16, showing the spring-loaded engagement member of the coupling member in a disengaged position.
Figure 20:
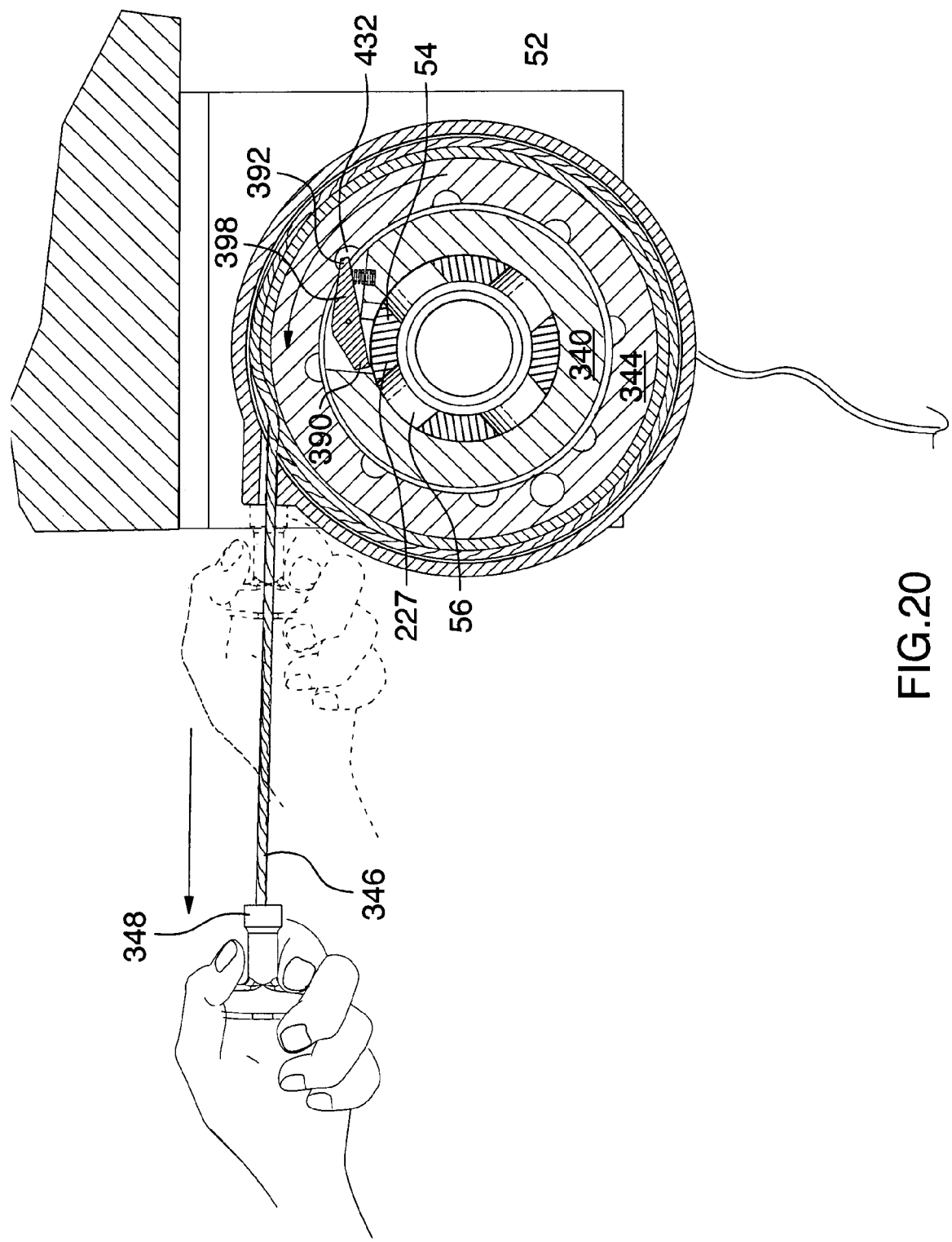
FIG. 20 is another cross-sectional view of the strap winding apparatus similar to that illustrated in FIG. 19, showing the handle and cord of the spool member being pulled, the spring-loaded engagement member of the coupling member being pivoted to an engaged position such that the coupling ring is now fixed for rotation with the spool member.

The engagement member 382 is pivotable between a disengaged position 396 (shown in FIG. 19) and an engaged position 398 (as best shown in FIG. 20). In the disengaged position 396, the second end 392 of the engagement member 382 is fully or at least substantially contained within the cutout 370, but may bear against the inner radial surface 402 of the spool member 344. When the strap winding apparatus 330 is mounted onto the hub member 52 and the engagement member 382 is in the disengaged position 396, the first end 390 thereof is also fully contained within the cutout 370.

In the engaged position 398, the second end 392 of the engagement member 382 extends outwardly from the cutout 370 to engage a portion of the spool member 344. When the strap winding apparatus 330 is operatively coupled to the hub member 52 with the engagement member 382 pivoted to its engaged position 398, the first end 390 thereof may abut the outer radial face 227 of the annular wall 54 or may only partially extend into one of the apertures 56 of the hub member 52.

The coupling ring 340 is also provided with biasing means 404 to bias the engagement member 382 toward the engaged position 398. As with the biasing means 230, the biasing means 404 in this embodiment takes the form of a helical compression coil spring 406. The coil spring 406 has a first end 408 and a second end 410. As best shown in FIG. 17c, the first end 408 of the coil spring 406 is seated within a blind bore 412 formed in the face 378, while the second end 410 is received within a cutout 414 defined in the engagement member 382 adjacent the first end thereof 390.

Figure 18B:
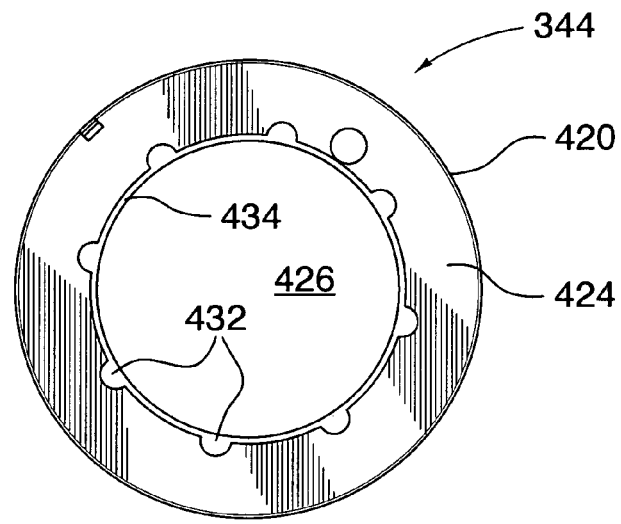
Figures 18A, 18C:
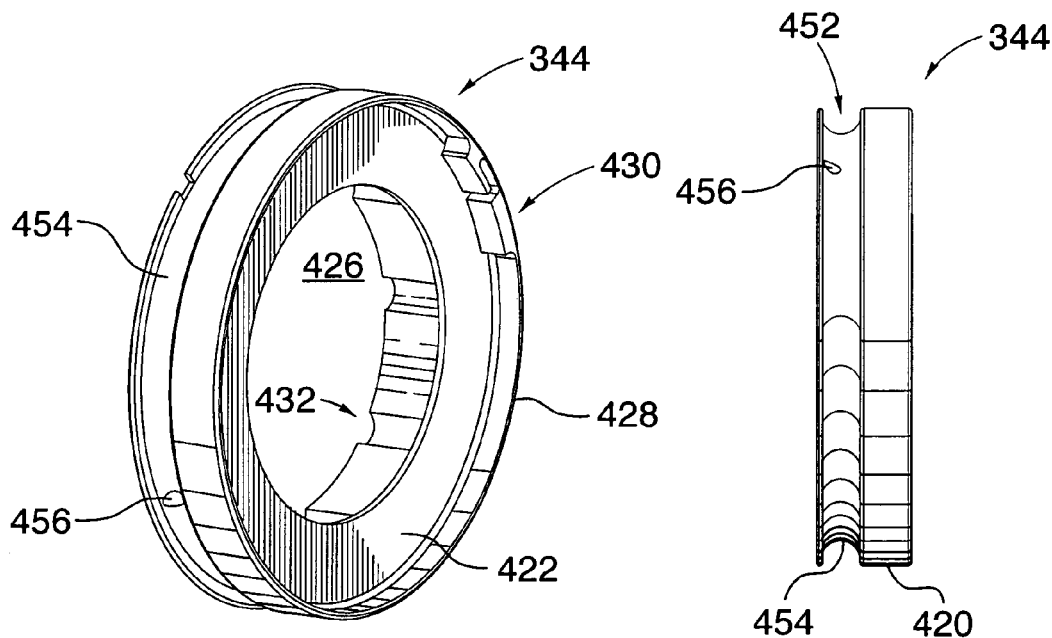

Referring now to FIGS. 18a, 18b and 18c, there is shown the spool member 344. The spool member 344 is generally similar to the spool member 88 in that it has a generally annular body 420 provided with a first side 422, a second opposite side 424 and a central aperture 426 extending therethrough. The central aperture 426 is sized to receive the coupling ring 340 for a snug fit therewith. Projecting outwardly from the first side 422 and running circumferentially about the outermost radial edge of the annular body 420 is a flange 428. In like fashion to the flange 288, the flange 428 is fashioned with a block-like projection 430 similar to the projection 290 (see FIG. 18a) which is adapted to receive and retain one of the ends of the spiral torsion spring 350.

Referring specifically to FIG. 18b, in contrast to the annular body 280 which has a plurality of V-shaped notches 300, the annular body 420 is provided with a plurality of relatively smaller, rebates 432 having a generally semi-circular shape. The rebates 432 are cut into the inner radial edge 434 of the annular body 420 and are configured to correspond generally to the shape of the second end 392 of the engagement member 382. Together the rebates 432 and the engagement member 382 define an indexed mating means that resembles the indexed mating means of the strap winding apparatus 20. In this embodiment, the annular body 420 is formed without the cavities 306 depicted in FIG. 10b.

Turning now to FIG. 18c, the annular body 420 also has a groove 452 that extends between the first and second sides 422 and 424 and along the peripheral edge of the annular body 420 to define a generally concave surface 454. When the cord 346 is stored on the spool member 344 it is wound onto the concave surface 454. A hole 456 is formed in the concave surface 454 through which the inner end of the cord 346 may be introduced to allow the cord 346 to be securely fastened to the spool member 344.

The various components of the strap winding apparatus 330 are assembled in substantially the same manner and substantially the same sequence as the strap winding apparatus 20 such that the description above in respect of the latter will suffice for the former.

Referring now to FIGS. 19 to 22, an exemplary use of the strap winding apparatus 330 is now described. To couple the strap winding apparatus 330 onto the winch 24, the operator or user orients the housing 332 such that the handle 348 is pointed away from the vehicle 26 in a direction generally parallel to the road surface, and aligns the aperture 356 defined in the coupling ring 340 with the hub member 52. Thereafter, the coupling ring 340 is urged against the hub member 52 such that the hub member 52 is received within the aperture 356 and the inner surface 358 of the sidewall 354 abuts the annular wall 54. At this time, the engagement member 382 is in its disengaged position 396, with both the first and second ends 390 and 392 fully or at least partially contained within the cutout 370, the second end 392 bearing against the inner radial surface 402 of the spool member 344 (see FIG. 19).

Thus coupled to the winch 24, the strap winding apparatus 330 is ready to be actuated. As shown in FIG. 20, the user grasps the handle 348 and pulls it outwardly away from the vehicle 26, thereby causing the cord 346 to unwind from the spool member 344 which, in turn, urges the spool member 344 to rotate in a counterclockwise rotation about the axis H-H of the winch 24. As the spool member 344 rotates, one of the rebates 432 will be moved-into position so as to allow the second end 392 of the engagement member 382 to be received therein. The engagement member 382 is urged to pivot to its engaged position 398 and to project outwardly from the cutout 370 for receipt into the rebate 432. When pivoted to the engaged position 398, the first end 390 of the engagement member 382 may brought be bear against outer radial face 227 of the annular wall 54. Thus arranged, torque applied in the counterclockwise direction to the spool member 344 may be transferred to the coupling ring 340.

Figure 21:
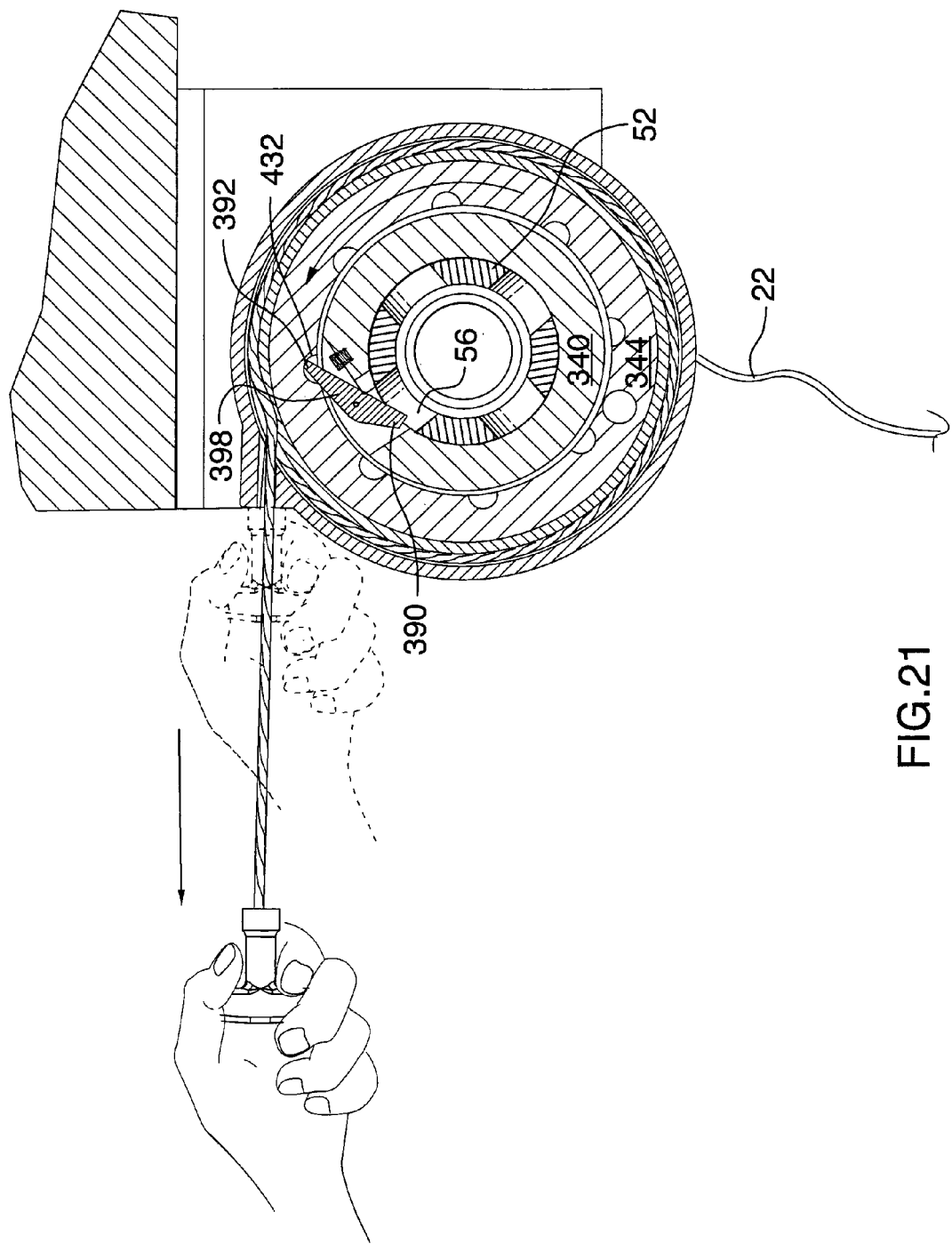
FIG. 21 is another cross-sectional view of the strap winding apparatus similar to that illustrated in FIG. 19, showing the handle and cord of the spool member being further pulled, the first end of the spring-loaded engagement member being received within one of the apertures defined in the hub member.
Figure 22:
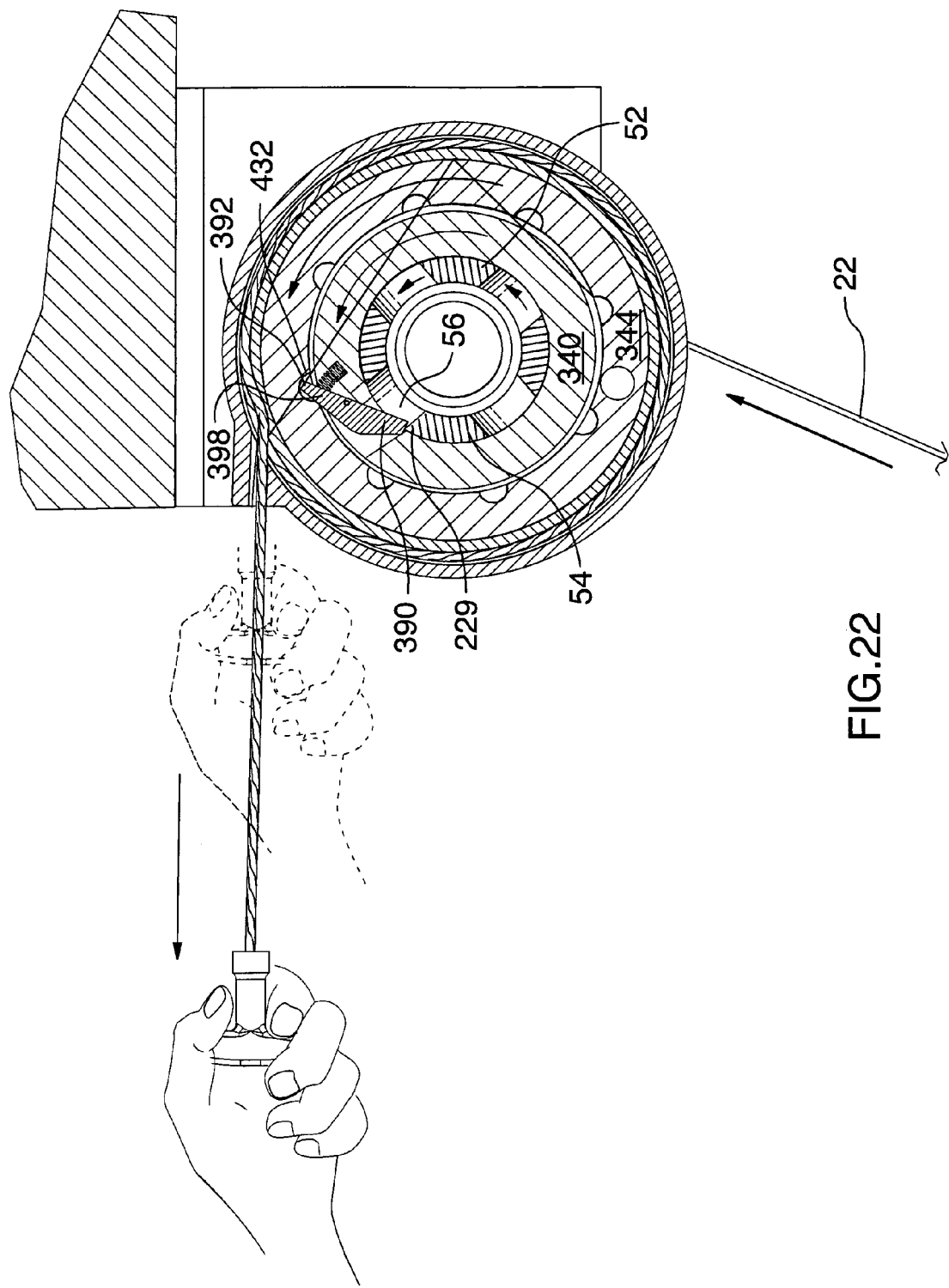
FIG. 22 is another cross-sectional view of the strap winding apparatus similar to that illustrated in FIG. 19, showing the spool member and the coupling ring further rotating, the first end of the engagement member abutting the inner edge of the annular wall such that the hub member is fixed for rotation with the coupling member and the strap being wound about the reel member of the winch.

Upon further rotation of the spool member 344, the second end 392 of the engagement member 382 will find an aperture 56 into which it will be at least partially received (as shown in FIG. 21). Ultimately, the second end 392 will abut the inner edge 229 of the annular wall 54 (as shown in FIG. 22). Once this occurs the coupling ring 340 and the hub member 52 are fixed or coupled to each other for rotation such that any further counterclockwise rotation of the coupling ring 340 will be imparted to the hub member 52 as well.

As the spool member 344 continues to rotate, the torque generated is transferred to the hub member 52 via the coupling ring 340 (see FIG. 22). As a result, the reel member 40 is urged to rotate in a counterclockwise direction about the H-H axis, thereby causing the elongate strap 22 to be wound onto the reel member 40.

As in the strap winding apparatus 20, the rotation of the spool member 344 also serves to load the spiral torsion spring 350. More specifically, as the spool member 344 rotates in the counterclockwise rotation, the spiral torsion spring 350 is urged to move from its released position (similar to that shown in FIG. 5) to its loaded position (similar to that shown in FIG. 14).

Figure 23:
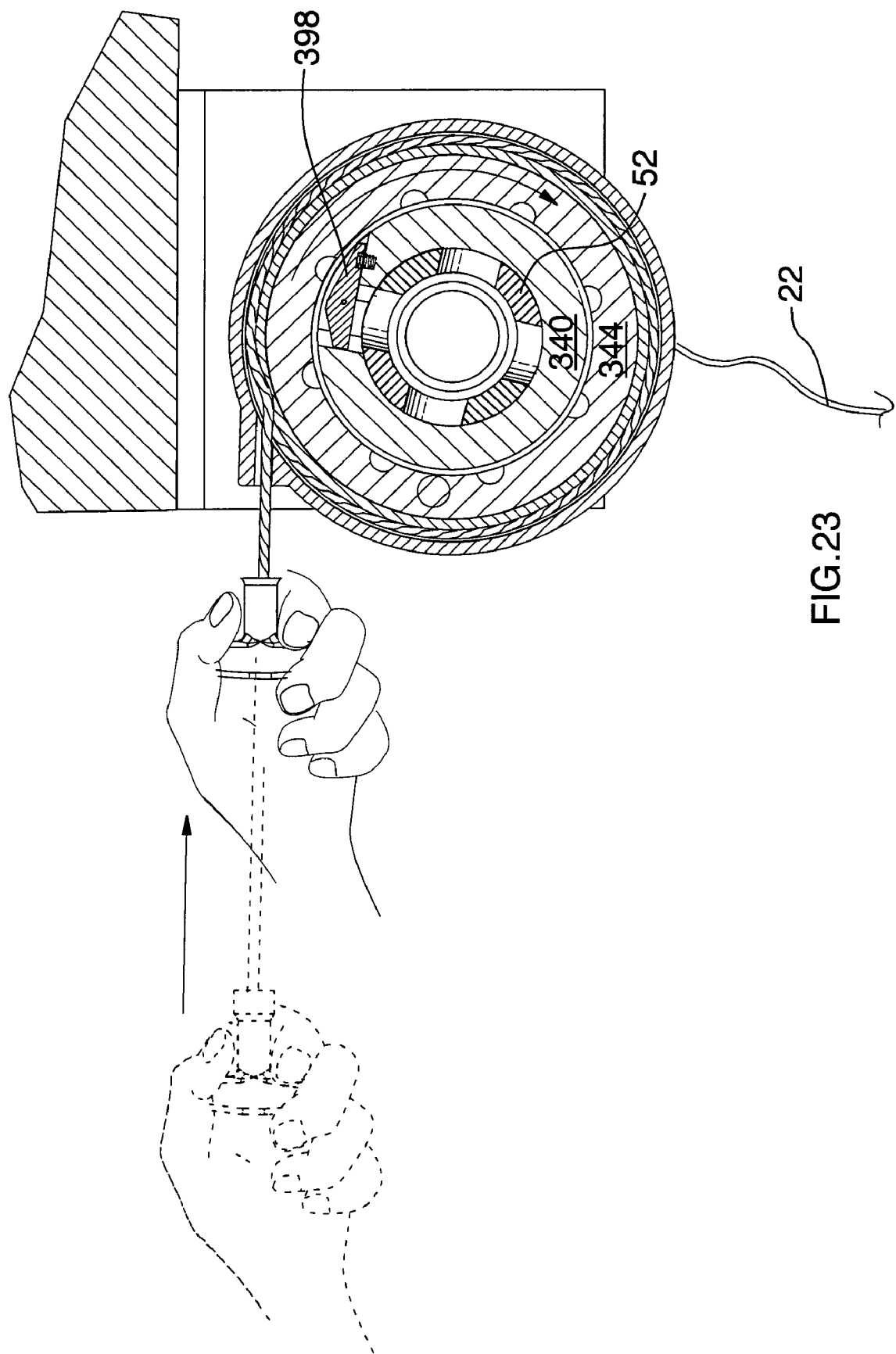
FIG. 23 is another cross-sectional view of the strap winding apparatus similar to that illustrated in FIG. 19, except that it shows the handle being released, the spring-loaded engagement member of the coupling member being pivoted to a disengaged position, and the cord being retracted into the winding assembly and wound about the spool member.

When the full length of the cord 346 has been unwound from the spool member 344, the user releases the handle 348. In the absence of a force acting on the spool member 344 to counteract the spring force in the torsion spring 350, the spring 350 seeks to return to its released position. As it does so, it applies a clockwise torque on the spool member 344 which causes the cord 346 to automatically wind about the spool member 344 (see FIG. 23). At this stage, no torque is transmitted to the coupling ring 340 or the hub member 52 because the clockwise rotation of the spool member 344 causes the engagement member 382 to move to its disengaged position 396.

Once the cord 346 has been fully retracted into the housing 332 and wound completely about the spool member 344, the strap winding assembly 330 is ready to be actuated again. The foregoing operation may be repeated as necessary to wind the entire length of strap 22 onto the winch 24. When the strap 22 has been entirely wound about the winch 24, the strap winding apparatus 330 may be decoupled from the winch 24 for further deployment on other winches 24.

Although the foregoing description and accompanying drawings relate to specific preferred embodiments of the present invention as presently contemplated by the inventor, it will be understood that various changes, modifications and adaptations, may be made without departing from the spirit of the invention.

What is claimed is:

1. An apparatus for winding an elongate strap onto a winch, the winch having a hub member to which may be coupled the strap winding apparatus and a reel element fixed to the hub member about which may be wound the elongate strap, the strap winding apparatus comprising:
a protective housing; and
a winding assembly at least partially retained within the housing, the winding assembly including:
a coupling ring sized to fit over the hub member for selective mating therewith; and
a spool assembly having a spool member mounted in surrounding relation with the coupling ring, a cord which may be wound about the spool member and which may be pulled to urge rotation of the spool member in a first direction, and a torsion spring member connected to the housing and the spool member; the torsion spring member being configured to store spring energy when the cord is pulled and the spool member rotates in the first direction, and to release spring energy to the spool member when the cord is released thereby urging the spool member to rotate in a second direction opposite to the first direction and causing the cord to be wound about the spool member;
the coupling ring having an engagement member pivotally mounted thereto, the engagement member being engageable with both the hub member and the spool member so as to allow torque from the spool member to be transmitted to the hub member via the coupling ring such that when the cord is pulled and the spool member rotates in the first direction the hub member will also rotate thereby causing the elongate strap to be wound about the reel member.

2. The strap winding apparatus of claim 1 wherein the coupling ring has a central aperture extending therethrough and includes an outer surface, an inner surface and a plurality of projections extending radially inward from the inner surface into the central aperture, the plurality of projections being configured for abutment with a portion of the hub member.

3. The strap winding apparatus of claim 2 wherein:
the hub member has an annular wall; and
each projection of the plurality has a generally arcuate surface configured to correspond substantially with the curvature of the annular wall.

4. The strap winding apparatus of claim 2 wherein the plurality of projections includes four projections equally spaced from each other.

5. The strap winding apparatus of claim 1 wherein the coupling ring has a central aperture extending therethrough, the central aperture having a generally circular shape.

6. The strap winding apparatus of claim 1 wherein the coupling ring has a central aperture extending therethrough and includes an outer radial surface, an inner radial surface and a cutout defined in the coupling ring extending between the outer radial surface and the inner radial surface thereof; the cutout providing access to the central aperture; the engagement member being disposed at least partially within the cutout.

7. The strap winding apparatus of claim 6 wherein:
the engagement member is pivotable between an engaged position and a disengaged position and includes a first end and a second end;
when in the engaged position, the first end of the engagement member extends outwardly of the cutout to engage the spool member and the second end of the engagement member projects into the central aperture of the coupling ring or engagement with the hub member;
when in the disengaged position, the first end of the engagement member is at least substantially contained within the cutout.

8. The strap winding apparatus of claim 7 wherein the coupling ring further includes means for biasing the engagement member in the engaged position.

9. The strap winding apparatus of claim 8 wherein the biasing means includes a compression coil spring having a first end supported by an interior surface of the coupling ring and a second end abutting the first end of the engagement member.

10. The strap winding apparatus of claim 1 wherein:
the engagement member is pivotable between an engaged position and a disengaged position;
when the engagement member is in the disengaged position, the spool member is free to rotate relative to the coupling ring.

11. The strap winding apparatus of claim 10 wherein when the engagement member is in the disengaged position, the coupling ring is free to rotate relative to the hub member.

12. The strap winding apparatus of claim 11 wherein:
the engagement member has a first end engageable with the spool member and an opposed second end engageable with the hub member; and
the hub member includes an annular wall having an outer surface;
when the engagement member is in the disengaged position, the second end of the engagement member bears against the outer surface of the annular wall.

13. The strap winding apparatus of claim 10 wherein:
the engagement member has a first end engageable with the spool member and an opposed second end engageable with the hub member; and
the hub member has an annular wall with a plurality of openings defined therein;
when the engagement member is in the disengaged position, the second end of the engagement member is received within one of the plurality of openings in the annular wall.

14. The strap winding apparatus of claim 1 wherein:
the hub member has an annular wall with a plurality of openings defined therein;
the spool member has a generally annular body defined by an inner radial surface and an outer radial surface, the inner radial surface having defined therein a plurality of grooves; and
the engagement member has a first end engageable with the any one of the plurality of grooves defined in the inner radial surface of the spool member and an opposed second end engageable with any one of the plurality of openings defined in the annular wall of the hub member.

15. The strap winding apparatus of claim 14 wherein the plurality of grooves includes eight grooves evenly spaced from each other.

16. The strap winding apparatus of claim 14 wherein the plurality of grooves have a shape selected from the group consisting of: (a) a V-shape; and (b) a semi-circle.

17. The strap winding apparatus of claim 1 further including indexed mating means operable to fix the coupling ring for rotation with the spool member at a predetermined angular position selected from a set of discrete angular positions relative to the spool member.

18. The strap winding apparatus of claim 17 wherein the indexed mating means includes a plurality of indexing notches and an indexing pin engageable with the any one of the plurality of the indexing notches.

19. The strap winding apparatus of claim 18 wherein:
the spool member has a generally annular body defined by an inner radial surface and an outer radial surface, the inner radial surface having defined therein a plurality of grooves, the plurality of grooves corresponding to the plurality the indexing notches of the indexed mating means; and
the engagement member has a first end engageable with the one of the plurality of grooves defined in the inner radial surface of the spool member and an opposed second end engageable with the hub member, the first end of the engagement member defining the indexing pin of the indexed mating means.

20. The strap winding apparatus of claim 1 wherein the spool member has a generally annular body defined by an inner radial surface and an outer radial surface, the annular body having a groove formed therein running circumferentially about the radial outer surface, the groove being configured to accommodate the cord when it is wound about the spool member.

21. The strap winding apparatus of claim 1 wherein:
the cord has an inner end attached to the spool member and an outer end; and
the spool assembly further includes a handle fastened to the outer end of the cord for actuating the winding assembly.

22. An apparatus for winding an elongate strap onto a winch, the winch having a hub member to which may be coupled the strap winding apparatus and a reel element fixed to the hub member about which may be wound the elongate strap, the strap winding apparatus comprising:
a protective housing; and
a winding assembly at least partially retained within the housing, the winding assembly including:
a coupling ring sized to fit over the hub member for selective mating therewith; and
a spool assembly having a spool member mounted in surrounding relation with the coupling ring, a cord which may be wound about the spool member and which may be pulled to urge rotation of the spool member in a first direction, and means for urging automatic rewinding of the cord onto the spool member when the cord is released;
the coupling ring having an engagement member pivotally mounted thereto, the engagement member being engageable with both the hub member and the spool member in a torque transmitting relationship therewith such that when the cord is pulled and the spool member rotates in the first direction the hub member will also rotate thereby causing the elongate strap to be wound about the reel member.

23. The strap winding apparatus of claim 22 wherein the automatic rewinding means includes a torsion spring member connected to both the housing and the spool member; the torsion spring member being configured to store spring energy when the cord is pulled and the spool member rotates in the first direction, and to release spring energy to the spool member when the cord is released thereby urging the spool member to rotate in a second direction opposite to the first direction and causing the cord to be wound about the spool member.

24. The strap winding apparatus of claim 23 wherein the torsion spring member has an inner end fixed to the housing and an outer end secured to the spool member for rotation therewith.

\* \* \* \* \*